(12) United States Patent
Ohkata et al.

(10) Patent No.: US 6,723,242 B1
(45) Date of Patent: Apr. 20, 2004

(54) METHOD AND APPARATUS FOR PROCESSING ORGANIC CHLORINE COMPOUNDS

(75) Inventors: Masanobu Ohkata, Matsudo (JP); Eiichi Nishikawa, Ooamisirasato-machi (JP); Kohei Miki, Isehara (JP); Jirou Satou, Kamakura (JP); Isamu Inoue, Hiratsuka (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/717,512

(22) Filed: Nov. 22, 2000

Related U.S. Application Data

(63) Continuation-in-part of application No. PCT/JP00/01830, filed on Mar. 24, 2000.

(30) Foreign Application Priority Data

Mar. 26, 1999 (JP) .......................................... P11-083897

(51) Int. Cl.$^7$ .................................................. C02F 3/00
(52) U.S. Cl. ........................ 210/601; 210/610; 210/612; 210/614; 210/620; 210/630
(58) Field of Search ................................. 210/601–605, 210/610–611, 612, 614, 620, 630

(56) References Cited

U.S. PATENT DOCUMENTS

| | | | |
|---|---|---|---|
| 5,055,193 A | | 10/1991 | Hooper |
| 5,614,097 A | * | 3/1997 | Bender |
| 6,030,533 A | * | 2/2000 | Karamanev et al. ........ 210/610 |

FOREIGN PATENT DOCUMENTS

| | | |
|---|---|---|
| JP | 9-234490 | 9/1997 |
| JP | 10-180237 | 7/1998 |
| JP | 10-257895 | 9/1998 |
| JP | 10-323646 | 12/1998 |

OTHER PUBLICATIONS

Bioremediation of Environments Contaminated with Aromatic Compounds, Nakagawa et al., School of Science and Engineering, Waseda University.
Formation of OCTA– and HEPTA Chlorodibenzo–P–Dioxins During Semi Anaerobic Digestion of Sewage Sludge, Klimm et al., Chemosphere, vol. 37, Nos. 9–12, pp. 2003–2011, 1998.
Proceedings of the 23rd Conference for Japan Society for Environmental Chemistry, Science Hall, Science and Technology Museum.
Removal of Hazardous Substances Such as Dioxins by Microbial Degradation, Ishiguro, Dept. of Environmental Science.

* cited by examiner

Primary Examiner—Chester T. Barry
(74) Attorney, Agent, or Firm—Arent Fox Kintner Plotkin & Kahn PLLC

(57) ABSTRACT

In the method of processing an organic chlorine compound in accordance with the present invention, slurry containing fly ash K including dioxins are supplied from a pretreatment bath to a biological treatment bath of a processing apparatus; nitrifying bacteria, denitrifying bacteria, aqueous ammonia, and methanol are supplied to the slurry from a nitrifying bacteria storage bath, a denitrifying bacteria storage bath, an ammonia storage bath, and a methanol storage bath, respectively; and a nitrifying reaction is carried out by the nitrifying bacteria in an aerobic atmosphere, so as to decompose the dioxins along with the nitrifying reaction.

13 Claims, 9 Drawing Sheets

METHOD AND APPARATUS FOR PROCESSING ORGANIC CHLORINE COMPOUNDS

RELATED APPLICATIONS

This is a Continuation-In-Part application of International Patent Application serial No. PCT/JP00/01830 filed on Mar. 24, 2000, now pending.

BACKGROUND OF THE INVENTION

1. Field of the Invention

The present invention relates to a method and apparatus for processing organic chlorine compounds.

2. Related Background Art

There are cases where objects to be processed such as fly ash or main ash generated from waste incinerators, leachate from waste disposal facilities, suspended matters contained in the leachate, soils contaminated by inappropriately disposed wastes, and biological sludge subjected to leachate treatments contain a high concentration of hard-to-decompose organic chlorine compounds represented by dioxins. There are urgent social needs for eliminating or detoxifying the hard-to-decompose organic chlorine compounds. Recently, various methods for decomposing and processing materials containing such organic chlorine compounds have been proposed.

Among these methods, examples of physicochemical methods include high temperature incineration method, molten salt incineration method, active carbon adsorption method, gamma ray decomposition method, ozone decomposition method, wet type air oxidization method, catalyst incineration method, supercritical hydroxylation method, alkaline chemical decomposition method, alkaline catalyst decomposition method, thermal desorption method, and the like. On the other hand, as a biological method, Japanese Patent Application Laid-Open No. HEI 10-323646 and Japanese Patent Application Laid-Open No. HEI 10-257895 disclose methods using microorganisms having a lignin decomposing capability.

Also, literatures, e.g., Hiroyuki Nakagawa et al., "Bio-Remediation of Environment Contaminated with Aromatic Compounds," *Water Purification and Liquid Wastes Treatment*, 39, 535–544 (1998), pp.539–540; Satoshi Takada, "Possibility of Decomposition of Dioxins by White-Rot Fungus," the 23rd Lecture Meeting of Japan Society for Environmental Chemistry, Advanced Abstracts, 35–40 (1998); Tomohiko Ishiguro, "Decomposition and Elimination of Noxious Chemical Materials Such as Dioxins by Microorganisms," *Journal of Water and Waste*, 33, 645–651 (1991); and the like generally describe methods using polychlorinated biphenyl (PCB) decomposing microorganisms, white-rot fungus, and the like. Further, a literature—C. Klimm et al., *Chemosphere*, 37, 2003–2011 (1998)—reports an example of processing dioxins in a case where an object to be treated is kept under an anaerobic condition.

SUMMARY OF THE INVENTION

The inventors have studied the above-mentioned conventional methods and, as a result, have found the following problems. Namely:

(1) Conventional physicochemical methods often necessitate complicated, large-scale apparatus for fully decomposing organic chlorine compounds, such as dioxins, contained in the object to be processed. Among them, there are methods for which high temperature, high pressure, and the like are indispensable conditions. Therefore, if such methods are employed, then the processing tends to take time and labor, thereby raising the processing cost.

(2) Microorganisms employed in conventional biological methods tend to be hard to handle and collect. Also, there is a tendency that the kinds of dioxins fully decomposable thereby are limited, and the processing with a favorable stability and reproducibility is hard to carry out. As a result, the efficiency of decomposing dioxins may not always be sufficient.

(3) In the method in which the object to be processed is kept under an anaerobic condition, the effect of reducing dioxins with time cannot fully be obtained.

In view of such circumstances, it is an object of the present invention to provide a method and apparatus for processing organic chlorine compounds, which can decompose hard-to-decompose organic chlorine compounds such as dioxins by a treatment simpler than conventional ones, can remarkably improve the efficiency of decomposition, and can lower the processing cost.

For solving the above-mentioned problems, the inventors have repeated diligent studies, and have found that, if a specific microorganic body is caused to act on an object to be processed containing an organic chlorine compound such as a dioxin under a predetermined condition, the organic chlorine compound can be decomposed. Also, the inventors have found that the decomposing rate of organic chlorine compound can be enhanced if components inhibiting the decomposition of organic chlorine compound by the microorganic body are eliminated under a predetermined processing condition. The inventors have further repeated studies based on these findings, thereby accomplishing the present invention.

Namely, the method of processing an organic chlorine compound in accordance with the present invention is a method of decomposing and eliminating the organic chlorine compound in an object to be processed, the method comprising a biological treatment process of causing a first microorganic body capable of oxidizing reduced nitrogen to come into contact with the object to be processed, and biologically processing the object to be processed in a state containing the first microorganic body, so as to decompose the organic chlorine compound.

In such a method of processing an organic chlorine compound, if an aerobic treatment is carried out as the biological treatment, then a nitrifying reaction in which reduced nitrogen is oxidized by the first microorganic body is carried out. At this time, along with the nitrifying reaction, a reaction of decomposing the organic chlorine compound contained in the object to be processed proceeds, whereby the organic chlorine compound is decomposed, so as to turn into lower hydrocarbon, carbon dioxide, water, and the like.

Though the mechanism of decomposing the organic chlorine compound has not fully been elucidated, it is presumed that a conjugate reaction such as co-oxidation, for example, proceeds in an enzymatic reaction system in which an oxidase produced by the microorganic body involves, whereby the organic chlorine compound is oxidized and decomposed along with the oxidization (nitrification) of reduced nitrogen. However, the action is not restricted thereto. Such an enzymatic reaction does not necessitate severe reaction conditions such as high temperature and high pressure in particular, whereby hard-to-decompose organic chlorine compounds can be decomposed by very simple processing.

Preferably, a reduced nitrogen adding process for adding reduced nitrogen to the object to be processed is provided.

As a consequence, an amount of reduced nitrogen sufficient for carrying out the aerobic treatment as the biological treatment can be supplied. Hence, the reaction of oxidizing reduced nitrogen by the first microorganic body and, consequently, the reaction of decomposing the organic chlorine compound can be caused to proceed reliably and sufficiently.

Thus, it is preferred that the biological treatment process comprises an aerobic treatment process of oxidizing reduced nitrogen contained in the object to be processed with the first microorganic body and decomposing the organic chlorine compound in an aerobic atmosphere. Here, as the first microorganic body, nitrite bacteria, nitrate bacteria, and the like which are easy to obtain and culture are preferably used. Examples of reduced nitrogen are those oxidized by such a first microorganic body, such as ammonium ion and urea, which may be originally contained in the object to be processed or be added thereto.

If the anaerobic treatment is carried out as the biological treatment, then the activity of first microorganic body for oxidizing reduced nitrogen tends to decrease. However, it has been verified that the organic chlorine compound in the object to be processed is favorably decomposed even in an anaerobic atmosphere in the state where the biological activity of the first microorganic body is maintained by way of a biologic treatment in an aerobic atmosphere (which may be the above-mentioned aerobic treatment process).

Though details of the mechanism of decomposing the organic chlorine compound have not been clear, it is presumed that, for example, an oxidase produced by the first microorganic body in the aerobic treatment is eluted as the first microorganic body is disassembled under the anaerobic condition, whereby the organic chlorine compound is oxidized and decomposed by an enzymatic reaction in which this oxidase involves. However, the action is not restricted thereto. As mentioned above, since such an enzymatic reaction does not necessitate severe reaction conditions such as high temperature and high pressure in particular, hard-to-decompose organic chlorine compounds can be decomposed by a very simple processing.

Thus, it will also be preferable if the biological treatment process comprises an anaerobic treatment process in which the object to be processed containing the first microorganic body keeping its biological activity by way of a biological treatment in an aerobic atmosphere is held in an anaerobic atmosphere. In addition, it is desirable that, in this anaerobic treatment process, supply of a gas including oxygen to the object to be processed is blocked, so as to form an anaerobic atmosphere, and this anaerobic atmosphere is maintained. In the anaerobic treatment process, it will be further preferable if the temperature of the object to be processed is held at 15° C. or higher, since the reaction of decomposing the organic chlorine compound is remarkably accelerated thereby.

It will be further preferred if the method further comprises an oxidized nitrogen eliminating process of reducing and eliminating oxidized nitrogen contained in the object to be processed with a second microorganic body capable of reducing oxidized nitrogen in an anaerobic atmosphere. If the object to be processed is one subjected to a nitrogen treatment of leachate or one with which the above-mentioned aerobic treatment process is carried out, for example, then oxidized nitrogen such as nitrate ion and nitrite ion generated upon oxidization of reduced nitrogen by the first microorganic body is contained in the object to be processed. Also, some of objects to be processed originally contain oxidized nitrogen. For such oxidized nitrogen, an environmental emission standard value has been defined, and there is a fear that the purified water or purified product obtained by processing the object to be processed may contain oxidized nitrogen by a nitrogen content exceeding its standard value in some cases.

The inventors have also found that the decomposing efficiency of inorganic chlorine compound in the aerobic and anaerobic treatment processes decreases if such oxidized nitrogen exists in the object to be processed. In the anaerobic treatment process in particular, the organic chlorine compound tends to be insufficiently eliminated if the object to be processed contains a microorganic body, such as denitrifying bacteria, adapted to reduce oxidized nitrogen as in the case of biological sludge subjected to a biological treatment. It is presumed that, if oxidized nitrogen exists under an anaerobic condition, then the activity of the denitrifying bacteria is maintained and, under the influence thereof, the first microorganic body is restrained from being disassembled, whereby the elution of oxidase is stagnated. However, the action is not restricted thereto.

If the object to be processed containing such oxidized nitrogen is subjected to the oxidized nitrogen eliminating process, then a denitrifying reaction in which the second microorganic body reduces oxidized nitrogen by using oxidized nitrogen and nutrients is carried out. As a consequence, oxidized nitrogen can be eliminated under a mild condition of normal temperature and normal pressure by turning it into nitrogen, carbon dioxide, water, and the like. As a consequence, the decomposing efficiency of organic chlorine compound in the aerobic and anaerobic treatment processes can fully be prevented from decreasing. Here, denitrifying bacteria and the like which are easy to obtain and culture are preferably used as the second microorganic body. Preferably, the oxidized nitrogen eliminating process is carried out before the aerobic treatment process, after the aerobic treatment process, or before the anaerobic treatment process.

More preferably, the aerobic treatment process has a first microorganic body adding step of adding the first microorganic body to the object to be processed; a reduced nitrogen adding step of adding reduced nitrogen to the object to be processed; and a decomposing step of supplying a gas containing oxygen to the object to be processed, so as to form an aerobic atmosphere, and causing the first microorganic body to oxidize reduced nitrogen and decompose the organic chlorine compound.

If the object to be processed is one containing a sufficient amount of the first microorganic body and/or reduced nitrogen beforehand, as with sludge generated upon another biological treatment, for example, then the first microorganic body adding step and/or reduced nitrogen adding step may not be carried out. Also, the first microorganic body adding step and reduced nitrogen adding step may be carried out simultaneously, or any of them may be carried out earlier, whereas they can be carried out before or simultaneously with the decomposing step. Here, the reduced nitrogen adding step is substantially equivalent to the above-mentioned reduced nitrogen adding process.

In this manner, oxygen is supplied to the object to be processed, so that an aerobic atmosphere is formed favorably, whereby a nitrifying reaction in which the first microorganic body oxidizes reduced nitrogen and its accompanying reaction of decomposing organic chlorine compound proceed under a mild condition of normal temperature and normal pressure. As a consequence, hard-to-decompose organic chlorine compounds can be decomposed by a mild and simple treatment at normal temperature and normal pressure without necessitating severe reaction conditions such as high temperature and high pressure. Also, since reduced nitrogen is positively added, the nitrifying reaction caused by the first microorganic body can be maintained favorably.

More preferably, the oxidized nitrogen eliminating process has a second microorganic body adding step of adding the second microorganic body to the object to be processed; a carbon source adding step of adding to the object to be processed an organic carbon source which becomes a nutrient for the second microorganic body; and an eliminating step of blocking supply of a gas containing oxygen to the object to be processed, so as to form an anaerobic atmosphere, and causing the second microorganic body to reduce and eliminate oxidized nitrogen.

If the object to be processed is one containing a sufficient amount of the second microorganic body and/or organic carbon source beforehand, such as surplus sludge generated upon another biological treatment, then the second microorganic body adding step and/or carbon source adding step may not be carried out. Also, the second microorganic body adding step and carbon source adding step may be carried out simultaneously, or any of them may be carried out earlier, whereas they can be carried out before or simultaneously with the eliminating step. If such an oxidized nitrogen eliminating step is carried out, then the second microorganic body grows while using the organic carbon source (also referred to as carbon source or hydrogen donor) as a nutrient, during which a denitrifying reaction for reducing oxidized nitrogen is favorably carried out.

It will also be preferred if an object to be processed mixing process of adding to and mixing with the object to be processed in at least one of the aerobic treatment process, oxidized nitrogen eliminating process, and anaerobic treatment process another object to be processed, different therefrom, containing an organic chlorine compound. In this manner, the other object to be processed can be processed by use of the first microorganic body acclimatized to the environment of use in each process. As a consequence, the decomposing efficiency of the organic chlorine compound contained in the other object to be processed is enhanced.

More preferably, as the first microorganic body and/or second microorganic body, those in a dehydrated cake form whose moisture is at least partly eliminated or in a lyophilized powder form are used.

Microorganic bodies are often obtained in the form of biological sludge as being cultured and acclimatized in a liquid such as a culture liquid in general. If a dehydrated cake form of biological sludge whose moisture is at least partly eliminated is used as a microorganic body, then its volume can be lowered. Also, since it is not liquid, its handling such as transportation and storage and operations for adding it to the object to be processed become easier, and the space for its storage and stock can be reduced. Further, since the moisture necessary for growing microorganic bodies decreases, the growth of inutile microorganic bodies which carry out no nitrifying reaction or inhibit the nitrifying reaction is suppressed.

On the other hand, if microorganic bodies are in a lyophilized powder form, then their volume reduction ratio is high, their volume can further be lowered, handling upon transport and storage as well as operations of adding them to the object to be processed become further easier, and the space for storage and stock can further be reduced. Also, since the moisture is eliminated by lyophilization, the above-mentioned growth of inutile microorganic bodies is further suppressed. Further, long-term storage is facilitated.

It will be useful if the method comprises a slurry-forming process of causing at least one of the object to be processed, the first microorganic body, and the second microorganic body to become slurry. In this manner, even if the object to be processed is a solid having a low water content, such as fly ash or soil, for example, the object to be processed can be made easier to flow. As a consequence, it becomes easier to supply a gas including oxygen to the object to be processed, whereby an aerobic atmosphere is further favorably formed.

As a result, the nitrifying reaction caused by microorganic bodies becomes active, whereby the reaction decomposing of organic chlorine compound accompanying the nitrifying reaction is accelerated. Also, it becomes easier for the first microorganic body and the oxidase produced by the first microorganic body to come into contact with the organic chlorine compound. Therefore, the nitrifying reaction caused by the first microorganic body and its accompanying reaction of oxidizing and decomposing the organic chlorine compound are further accelerated. Further, it becomes easier for the second microorganic body and oxidized nitrogen to come into contact with each other, whereby the reaction of decomposing oxidized nitrogen is accelerated. Also, when the first microorganic body and/or second microorganic body is used in the form of dehydrated cake or powder, their fluidity increases, whereby their miscibility with the object to be processed improves. As a result, the decomposing efficiency of organic chlorine compound can further be improved.

It will further be preferred if the aerobic treatment process has a pH adjusting step of adjusting the pH of the object to be processed containing the first microorganic body and reduced nitrogen to a range of 5 to 9, and/or a desalting step of adjusting the salt concentration of the object to be processed to 4% or lower. If such a pH condition is attained, the growth of first microorganic body becomes active, and its activity can be kept high. Therefore, the nitrifying reaction caused by the first microorganic body and its accompanying reaction of decomposing the organic chlorine compound can improve their efficiency.

If the salt concentration of the object to be processed exceeds 4%, then the activity of oxidase produced by the first microorganic body tends to be suppressed, whereby it becomes harder to maintain the nitrifying reaction. As a result, the nitrifying reaction is stagnated, whereby the reaction of decomposing the organic chlorine compound, in which this oxidase is supposed to be involved, tends to be suppressed. Here, if the salt concentration of the object to be processed prior to the addition of the first microorganic body and reduced nitrogen is 4% or lower, then the salt concentration in the object to be processed in a later treatment can reliably become 4% or lower.

In addition, it is desirable that, in the reduced nitrogen adding process and/or reduced nitrogen adding step, reduced nitrogen be added to the object to be processed such that the content of reduced nitrogen with respect to 1 ng of the organic chlorine compound becomes 0.01 to 10.0 g-N. If this adding ratio is less than 0.01 g-N, then the amount of nitrifying reaction becomes insufficient, whereby the reaction of decomposing the organic chlorine compound would not proceed sufficiently. If the adding ratio exceeds 10.0 g-N, by contrast, then the nitrifying reaction remarkably lowers the pH in the object to be processed. As a result, the amount of alkali agent injected for adjusting the pH increases, which is uneconomical. Also, there is a fear that the pH adjustment may raise the salt concentration and inhibit the nitrifying reaction. Here, the unit "g-N" indicates that it is the weight of nitrogen.

The apparatus for processing an organic chlorine compound in accordance with the present invention is aimed at effectively carrying out the method of processing the organic chlorine compound in accordance with the present invention, which is an apparatus for decomposing and eliminating the organic chlorine compound in an object to be processed, the apparatus comprising a biological treatment section in which a first microorganic body capable of oxidizing reduced nitrogen and the object to be processed come into contact with each other, and the object to be processed in a state containing the first microorganic body is biologically processed, so as to decompose the organic chlorine compound. Here, it will be preferable if a reduced nitrogen adding section for adding reduced nitrogen to the object to be processed is further provided.

Further, it is preferred that the biological treatment section comprises an aerobic treatment section, formed with an aerobic atmosphere, in which reduced nitrogen contained in the object to be processed is oxidized by the first microorganic body, and the organic chlorine compound is decomposed; and/or an anaerobic treatment section, formed with an anaerobic atmosphere, for holding in the anaerobic atmosphere the object to be processed containing the first microorganic body keeping a biological activity by way of a biological treatment in an aerobic atmosphere.

More preferably, in the anaerobic treatment section, the object to be processed is supplied, supply of a gas containing oxygen to the object to be processed is blocked, so as to form an anaerobic atmosphere, and this anaerobic atmosphere is maintained. Further, it will be useful if the anaerobic treatment section has a temperature adjustment section capable of adjusting the temperature of the object to be processed.

It is desirable that an oxidized nitrogen eliminating section in which oxidized nitrogen contained in the object to be processed is reduced and eliminated by a second microorganic body capable of reducing this oxidized nitrogen be further provided.

Specifically, it is further preferred that the aerobic treatment section comprises a first microorganic body adding section for adding the first microorganic body to the object to be processed; a reduced nitrogen adding section for adding reduced nitrogen to the object to be processed; a diffuser section for sending a gas containing oxygen to the object to be processed; and a first reaction treatment section in which the object to be processed is supplied, and the first microorganic body oxidizes reduced nitrogen and decomposes the organic chlorine compound.

It is also preferred that the oxidized nitrogen eliminating section have a second microorganic body adding section for adding a second microorganic body to the object to be processed; a carbon source adding section for adding to the object to be processed an organic carbon source which becomes a nutrient for the second microorganic body; and an eliminating section in which the object to be processed is supplied, supply of a gas containing oxygen to the object to be processed is blocked, and oxidized nitrogen is reduced and eliminated by the second microorganic body.

Further, it is preferred that an object to be processed mixing section for adding to and mixing with the object to be processed in at least one of the aerobic treatment section, oxidized nitrogen eliminating section, and anaerobic treatment section another object to be processed, different therefrom, containing an organic chlorine compound be provided.

It is further preferred that a slurry-forming section in which a liquid is added to and mixed with at least one of the object to be processed, first microorganic body, and second microorganic body, so as to cause at least one of the object to be processed, first microorganic body, and second microorganic body to become slurry be provided. In addition, it is further preferred that the aerobic treatment section have a pH adjustment section for adjusting the pH of the object to be processed containing the first microorganic body and reduced nitrogen, and/or a desalting section for adjusting the salt concentration of the object to be processed.

In the present invention, dioxins refer to at least one kind of or a mixture of at least two kinds (including homologues) of polychlorinated dibenzoparadioxins (PCDDs), polychlorinated dibenzofurans (PCDFs), and coplanar polychlorinated biphenyls (coplanar PCBs).

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, embodiments of the present invention will be explained with reference to the accompanying drawings. Here, constituents identical to each other will be referred to with numerals or letters identical to each other without repeating their overlapping explanations.

Figure 1:
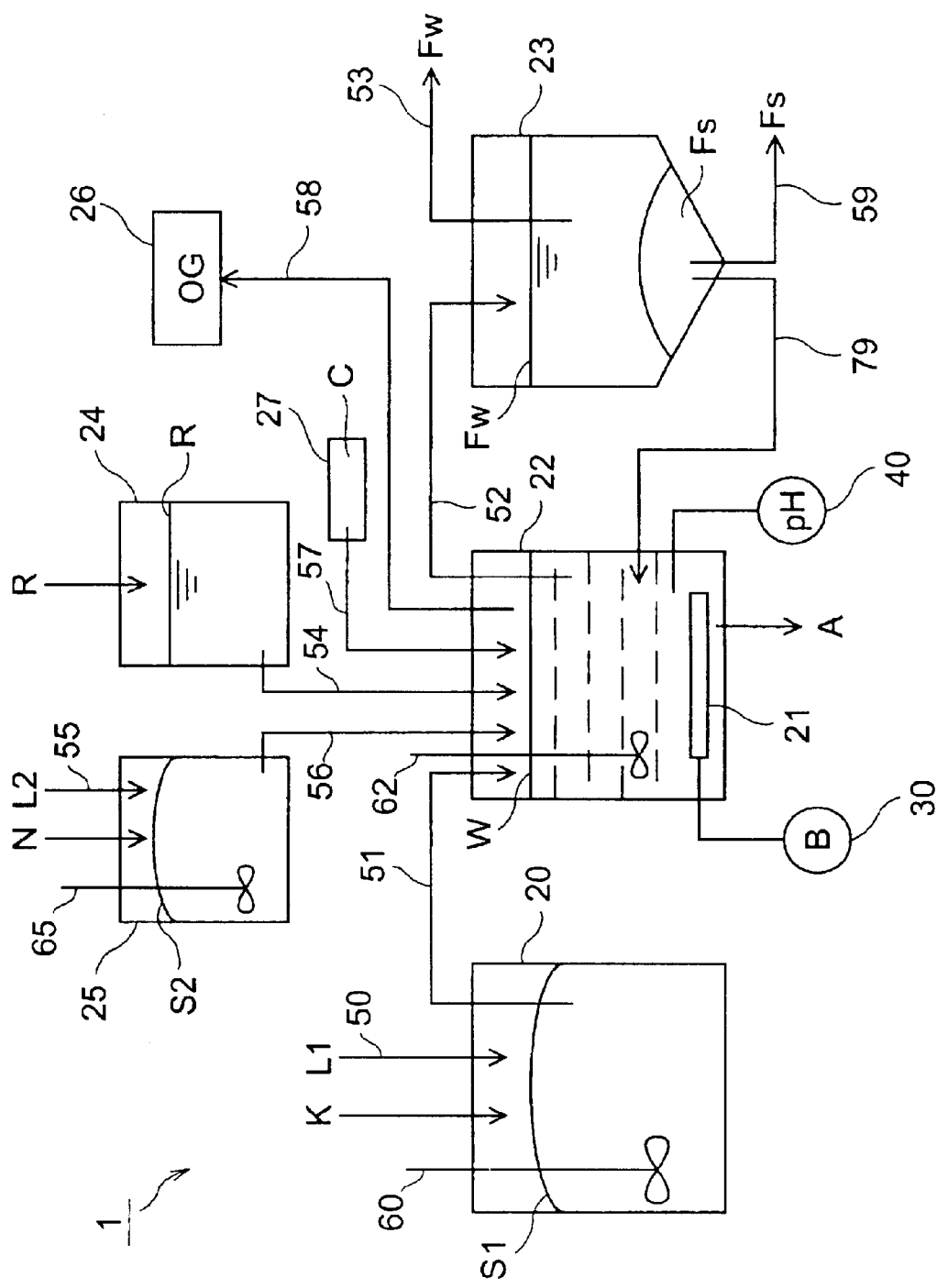
FIG. 1 is a block diagram showing a first embodiment concerning the apparatus for processing an organic chlorine compound in accordance with the present invention.

FIG. 1 is a block diagram showing a first embodiment concerning the apparatus for processing an organic chlorine compound in accordance with the present invention. The processing apparatus 1 (apparatus for processing the organic chlorine compound) is configured such that a pretreatment bath 20, a solid-liquid separating bath 23, an ammonia storage bath 24, a nitrifying bacteria storage bath 25, an off-gas system 26, and an alkali storage bath 27 are connected to a reaction treatment bath 22 (first biological treatment section).

In the pretreatment bath 20, fly ash K (object to be processed) containing organic chlorine compounds such as dioxins is subjected to pretreatment. For example, the fly ash K is powder-like ash obtained when burnable wastes are incinerated in waste incinerating facilities. A water supply line 50 for transferring water L1 is connected to the pretreatment bath 20, whereas the latter is further provided with a stirrer 60 for stirring and mixing the fly ash K and water L1, so as to desalt and wash the fly ash K.

Further connected to the pretreatment bath 20 is a drain line (not depicted) for partly letting out the water L1 in which a salt is dissolved upon mixing the fly ash K and water L1. The fly ash K desalted and washed here becomes slurry S1. Thus, the pretreatment bath 20, water L1, water supply line 50, stirrer 60, and drain line constitute a desalting section and a slurry-forming section.

Examples of dioxins include polychlorinated dibenzoparadioxins (PCDDS), polychlorinated dibenzofurans (PCDFS), and coplanar polychlorinated biphenyls (coplanar PCBS) represented by the following formulae (1), (2), and (3), respectively. They are quite hard to dissolve and quite hard to decompose among organic chlorine compounds, and are compounds which are quite hard to process by conventional methods, thereby being considered as materials which are problematic in terms of environmental conservation, reduction of influence to organisms, and the like.

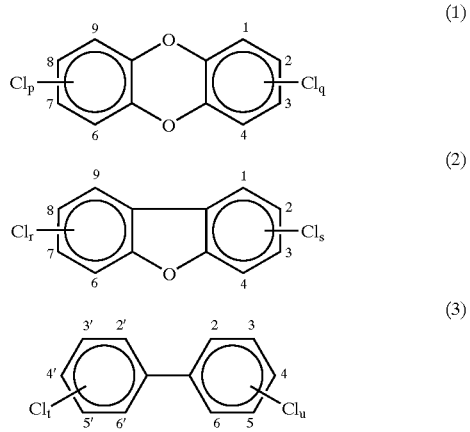

[Here, p and q in formula (1) and r and s in formula (2) each indicate an integer from 0 to 4, where $1 \leq p+q \leq 8$, and $1 \leq r+s \leq 8$. Also, t and u in formula (3) each indicate an integer from 0 to 5, where $1 \leq t+u \leq 10$.]

The ammonia storage bath 24 is used for storing aqueous ammonia R as a biologically utilizable reduced nitrogen, and is provided with a transfer line 54 for supplying the aqueous ammonia R to the biological treatment bath 22. Thus, the ammonia storage bath 24 and transfer line 54 constitute a reduced nitrogen adding section. Strictly speaking, reduced nitrogen is nitrogen within ammonia molecule or ammonia ion contained in the aqueous ammonia R, whereas the aqueous ammonia R acts as a source for supplying reduced nitrogen.

Further, the nitrifying bacteria storage bath 25 is used for storing nitrifying bacteria N (first microorganic body) having a capability of oxidizing reduced nitrogen. A water supply line 55 for supplying culture solution L2 which can culture the nitrifying bacteria N is connected to the nitrifying bacteria storage bath 25, whereas the latter is provided with a stirrer 65 for stirring and mixing the nitrifying bacteria N and culture solution L2, so as to yield slurry. Thus, the nitrifying bacteria storage bath 25, culture solution L2, water supply line 55, and stirrer 65 constitute a slurry-forming section.

Also connected to the nitrifying bacteria storage bath 25 is a transfer line 56 for transferring to the biological treatment bath 22 highly fluid slurry S2 obtained upon mixing the nitrifying bacteria N and culture solution L2. Thus, the bacteria storage bath 25 and the transfer line 56 constitute a first microorganic body adding section.

To the biological treatment bath 22, slurries S1, S2 are supplied from the pretreatment bath 20 and the nitrifying bacteria storage bath 25, respectively, and the aqueous ammonia R is supplied from the ammonia storage bath 24. The biological treatment bath 22 has a stirrer 62 for stirring and mixing these supplied products, whereby the slurries S1, S2 and aqueous ammonia R are stirred and mixed, so as to become a mixture W (object to be processed). Installed within the biological treatment bath 22 is a diffuser tube 21 (diffuser section), connected to a blower 30, for sending air as a gas containing oxygen into the mixture W. As will be explained later, a nitrifying treatment for decomposing the organic chlorine compounds in the object to be processed is performed within the biological treatment bath 22.

The alkali storage bath 27 is used for storing alkali C to be added to the mixture W for adjusting the pH thereof to a value suitable for the biological treatment, and has a transfer line 57 for supplying the alkali C to the biological treatment bath 22. Thus, the alkali storage bath 27 and transfer line 57 constitute a pH adjustment section.

The off-gas system 26 is used for letting out gases or gaseous components occurring within the biological treatment bath 22 from the processing apparatus 1 by way of an exhaust line 58, and processing these gases if necessary. Examples of such gaseous components include the excess of air supplied to the reaction treatment bath 22, ammonia gas evaporating from the aqueous ammonia R, carbon dioxide gas which is a reaction product, and NOx gas and nitrogen gas though in a trace amount.

The biological treatment bath 22 further comprises a pH meter 40 for monitoring the pH of mixture W and the change in pH, and a sampling line for sampling a part of the mixture W within the biological treatment bath 22 and yielding an analysis sample A.

The solid-liquid separating bath 23 is used for separating the processed mixture w by gravity sedimentation into a processed liquid Fw, which is a supernatant, and a processed solid Fs. Connected to the solid-liquid separating bath 23 are a transfer line 53 for letting out the processed liquid Fw, a transfer line 59 for letting out a part of the processed solid Fs as surplus sludge, and a transfer line 79 for returning the remnant of processed solid Fs as thickened sludge to the biological treatment bath 22.

A first embodiment concerning the method of processing an organic chlorine compound in accordance with the present invention carried out by use of the processing apparatus 1 constructed as mentioned above will now be explained.

First, fly ash K containing dioxins is supplied to the pretreatment bath 20 and, while water L1 is supplied thereto by way of the water supply line 50, the fly ash K and water L1 are fully mixed by the stirrer 60. Consequently, the fly ash K is desalted and washed(desalting step). Subsequently, water L1 in which a salt is dissolved is separated from the fly ash K by sedimentation, filtration, or the like. A part of the water L1 is let out of the pretreatment bath 20 by way of a drain line (not depicted), and the desalted and washed fly ash K is formed into slurry S1 (slurry-forming process).

Preferably, the water L1 injected into the pretreatment bath 20 here is in an amount which can desalt and wash the fly ash K such that the salt concentration in the mixture w having been formed from the object to be processed within the biological treatment bath 22 or the salt concentration in the slurry S1 becomes 4% or lower. If their salt concentration is 4% or lower, then a nitrifying reaction in which nitrifying bacteria are involved, which will be explained later, can be carried out favorably.

In the case where the fly ash K contains foreign matters and contaminants, it is desirable that these foreign matters and contaminants to be eliminated by sieving (sizing) or the like, and they may be eliminated by sedimentation or the like in the pretreatment bath 20.

The solid content in the slurry S1, i.e., the content of fly ash K, is adjusted to such a content range within which stirring is possible and gases can easily be supplied. For example, it is preferably adjusted to about 0.5% to 10% by mass if water L1 is used as a mixing medium for slurry S1.

If the solid content is less than 0.5% by mass, then the fluidity of slurry S1 is enhanced, so that the gas supply is carried out favorably, but the volume of the pretreatment bath 20 and biological treatment bath 22 increases, so that the apparatus becomes larger, which is uneconomical. If the solid content exceeds 10% by mass, by contrast, then the pretreatment bath 20 and biological treatment bath 22 can be made smaller, but the fluidity of slurry S1 tends to deteriorate, whereby uniform stirring and gas supply gradually become difficult.

On the other hand, while nitrifying bacteria N are introduced into the nitrifying bacteria storage bath 25, culture solution L2 for the nitrifying bacteria N is supplied thereto by way of the water supply line 55. Then, they are stirred and mixed by the stirrer 65, so that the nitrifying bacteria N are formed into slurry S2 (slurry-forming process).

Here, it will be preferred if the nitrifying bacteria N are cultured and acclimatized in the nitrifying bacteria storage bath 25 such that MLVSS (Mixed Liquor Volatile Suspended Solids) becomes preferably 100 mg/l or higher, more preferably 1000 mg/l or higher, and that their nitrifying capability attains an active state of preferably 0.01 kg-N/kg-SS/day or higher, more preferably 0.05 kg-N/kg-SS/day or higher. Here, the units "kg-N" and "kg-SS" refer to masses of nitrogen and suspended matters (SS: Suspended Solids), respectively (ditto in the following).

As the form of nitrifying bacteria N, those in a state where water is eliminated as much as possible from sludge formed like a floc after being cultured and acclimatized beforehand in a culture liquid under a natural or synthetic environment, or in a state in which water is partly eliminated therefrom can be used favorably. An example of the former is sludge lyophilized into powder. An example of the latter is a dehydrated cake preferably having a moisture content of about 70% by mass or higher obtained after the moisture content in sludge is eliminated by about 30% by mass or less. If the moisture content in the dehydrated cake is less than about 70% by weight, then the cell water of nitrifying bacteria N tends to be eliminated as well.

Such a form of nitrifying bacteria N with lowered moisture content can yield a smaller volume as compared with their original state where they exist as a mass in the culture liquid, and can be handled as a solid. Therefore, the handling of nitrifying bacteria N at the time of transfer and at the time of storage and stock is easy. Also, the space for storage and stock can be reduced. Further, since the moisture content necessary for growing microorganic bodies is small, biological reactions can be prevented from being effected before the microorganic bodies are added to the object to be processed, or the growth of inutile microorganic bodies which effect no desirable biological reactions or inhibit such reactions can be suppressed. Also, the powder obtained by lyophilization can easily be stored for a long period.

Aqueous ammonia R is supplied to and stored in the ammonia storage bath 24. As the aqueous ammonia R, one whose concentration has been adjusted beforehand may be supplied to the ammonia storage bath 24 or its concentration may be adjusted after it is supplied to the ammonia storage bath 24.

Subsequently, a predetermined amount of slurry S1 is transferred from the pretreatment bath 20 to the biological treatment bath 22 by way of the transfer line 51. Also, a predetermined amount of nitrifying bacteria N is added to the slurry S1 within the biological treatment bath 22 from the nitrifying bacteria storage bath 25 by way of the transfer line 56 (first microorganic body adding step). Further, a predetermined amount of aqueous ammonia R is added to the slurry S1 from the ammonia storage bath 24 by way of the transfer line 54 (reduced nitrogen adding process or reduced nitrogen adding step).

Then, they are stirred and mixed by the stirrer 62, so as to yield the mixture W. Subsequently, while stirring is carried out, the blower 30 is driven, so as to send out air to the diffuser tube 21, thereby causing the diffuser tube 21 to jet out fine bubbles of air to the mixture W.

These fine bubbles form a gas/liquid multiphase flow, which sends air to the whole mixture W, so that oxygen is distributed throughout the mixture W, whereby a favorable aerobic atmosphere is formed. Here, it will be preferred if the amount of air supplied from the blower 30 is such that the dissolved oxygen content in the mixture W is preferably 0.5 mg/L or higher. Also, at least one dissolved oxygen content meter may be installed in the biological treatment bath 22, so as to monitor the dissolved oxygen content in the mixture W.

Once the aerobic atmosphere is formed, oxidization of ammonium ion, i.e., nitrifying reaction, is effected by the nitrifying bacteria N. Here, as the nitrifying bacteria N, those including nitrite bacteria and/or nitrate bacteria can be used. Nitrite bacteria, also referred to as ammonium oxidizing bacteria, have a capability of oxidizing ammonium ion ($NH_4^+$) into nitrite ion ($NO_2^-$) and carry out a reaction represented by the following expression (4):

$$NH_4^+ + 1.5O_2 \rightarrow NO_2^- + H_2O + 2H^+ \tag{4}$$

Such nitrifying bacteria N include genera of Nitrosomonas, Nitrosococcus, Nitrosospira, Nitrosocystis, and the like, which are contained in soil and are easy to obtain and culture.

The nitrate bacteria, also referred to as nitrite oxidizing bacteria, have a capability of oxidizing nitrite ion ($NO_2^-$) into nitrate ion ($NO_3^-$) and carry out a reaction represented by the following expression (5):

$$NO_2^- + 0.5O_2 \rightarrow NO_3^- \tag{5}$$

Such nitrifying bacteria include genera of Nitrobacter, Nitrocystis, and the like, which are contained in soil and are easy to obtain and culture.

According to the reaction shown in the above-mentioned expressions (4) and(5), ammonium ion derived from the aqueous ammonia R contained in the mixture W is nitrated in the aerobic atmosphere after forming nitrite. Here, a reaction of oxidizing and decomposing dioxins contained in the fly ash K in the mixture W proceeds simultaneously, whereby the dioxins are decomposed into lower hydrocarbon, carbon dioxide, water, and the like (decomposing step).

Though such a mechanism of decomposing dioxins has not fully been elucidated, it is presumed that dioxins are oxidized and decomposed in an enzymatic reaction system in which oxidases such as ammonia monooxygenase produced by nitrifying bacteria N are involved. It is inferred that ammonia monooxygenase probably acts on dioxins, so that a kind of conjugate reaction such as a co-oxidation reaction in which dioxins are oxidized in parallel with the nitrifying reaction shown in expressions (4) and (5) occurs. However, the action is not restricted thereto.

Here, the pH and changes in pH of the mixture W within the biological treatment bath 22 are monitored by the pH meter 40 installed in the biological treatment bath 22. If the above-mentioned nitrifying reaction is carried out while air is diffused into the mixture W from the diffuser tube 21, then the pH of mixture W shifts toward the acidic side as the reaction proceeds.

Therefore, according to the actually measured value of pH, alkali C is added to the biological treatment bath 22 from the alkali storage bath 27 by way of the transfer line 57 so as to attain an optimal pH for activating the growth of nitrifying bacteria N, i.e., such that the pH becomes preferably 5 to 9, more preferably 7 to 8. Further, it will be preferred if the temperature of mixture W in the nitrifying reaction is 10 to 40° C.

As alkali C, alkaline solutions such as sodium hydroxide solution can be used. At a pH near 7, various buffer solutions may be used, and aqueous ammonia R may also be used as alkali C. If the pH value of mixture is adjusted to the above-mentioned preferable range, then the nitrifying bacteria N are actively grown, and the state where the activity of nitrifying bacteria N is enhanced is maintained. As a result, the decomposing efficiency of dioxins can be kept high.

Preferably, the amount of addition of aqueous ammonia R, which is a supply source of reduced nitrogen, is such a ratio that nitrogen (reduced nitrogen) in aqueous ammonia R is 0.01 to 10.0 g-N with respect to 1 ng of dioxins contained in the fly ash K in slurry S1.

If this ratio of addition is less than 0.01 g-N/1 ng of dioxins, then the amount of nitrifying reaction caused by nitrifying bacteria N tends to be insufficient, whereby the decomposing reaction does not proceed sufficiently. If the ratio of addition exceeds 10.0 g-N/1 ng of dioxins, by contrast, then the decrease of pH becomes remarkable along with the nitrifying reactions, whereby the amount of injection of alkali C for adjusting the pH increases, which is uneconomical. In this case, there is a fear of the pH adjustment raising the salt concentration of mixture W, whereby the nitrifying reaction caused by nitrifying bacteria N may be inhibited.

Therefore, if aqueous ammonia R is added such that the amount of nitrogen in the aqueous ammonia R is 0.01 to 10.0 g-N/1 ng of dioxins, then the nitrifying reactions caused by nitrifying bacteria N are carried out in an optimal state, whereby the dioxins can be decomposed effectively and economically. Also, it is desirable that the concentration or total amount of dioxins in fly ash K is analyzed beforehand such that aqueous ammonia R attains such a preferable ratio of addition, or a part of slurry S1 may be collected and analyzed. Here, aqueous ammonia R may be added continuously or intermittently.

Then, while carrying out the nitrifying reaction of mixture W, a part of the mixture W is sampled periodically, and thus obtained analysis sample A is analyzed, so as to quantitatively determine the concentration of dioxins in the mixture W. After it is verified that the concentration of dioxins has become a target value or lower, the supply of air from the diffuser tube 21 is stopped, so as to terminate the processing for decomposing dioxins along with the nitrifying reactions.

Thereafter, the mixture W is transferred to the solid-liquid separating bath 23 by way of the transfer line 52. The gases generated during the processing of mixture W within the biological treatment bath 22 are introduced into the off-gas system 26 by way of the exhaust line 58, so as to carry out exhaust processing.

In the solid-liquid separating bath 23, the mixture W is separated into the processed liquid Fw, which is a supernatant, and the processed solid Fs. By way of the transfer line 53, the processed liquid Fw is sent out to a drain system which is not depicted. On the other hand, a part of the processed solid Fs is let out as surplus sludge from the solid-liquid separating bath 23 by way of the transfer line 59. This surplus sludge can finally be dumped for landfill, or be reused as a resource. On the other hand, the remnant of processed solid Fs is returned to the biological treatment bath 22 as thickened sludge by way of the transfer line 79.

According to the method of processing an organic chlorine compound using the processing apparatus 1, such as the one explained in the foregoing, dioxins can fully be decomposed by a simple treatment in which aqueous ammonia R and nitrifying bacteria N are added to and mixed with slurry S1 of fly ash K, and then air is sent thereto under normal temperature and normal pressure, so as to form an aerobic atmosphere. Thus, without necessitating a severe reaction condition such as high temperature and high pressure in particular, dioxins can fully be decomposed by a treatment remarkably simpler than conventional ones, whereby the processing cost can drastically be lowered.

Since the processing method of this embodiment is wet type processing, the fear of dioxins diffusing to the outside and causing a secondary contamination can fully be prevented from occurring as compared with conventional methods using incineration processing represented by a high temperature incinerating method. Also, employed nitrifying bacteria N, aqueous ammonia R, and alkali C are inexpensive general-purpose products which are easily available, and conventional complicated, large-size processing apparatus are unnecessary, whereby the spending on equipment and the like can be cut down, so as to further lower the cost.

Further, since the fly ash K and nitrifying bacteria N are used in the form of slurry, it becomes easier for air to be uniformly supplied to their mixture W, and nitrifying bacteria N and oxidases, such as ammonia monooxygenase, produced by the nitrifying bacteria N are more likely to come into contact with dioxins. Hence, the nitrifying reactions caused by nitrifying bacteria N become further active, and the decomposition of dioxins can be accelerated.

Figure 2:
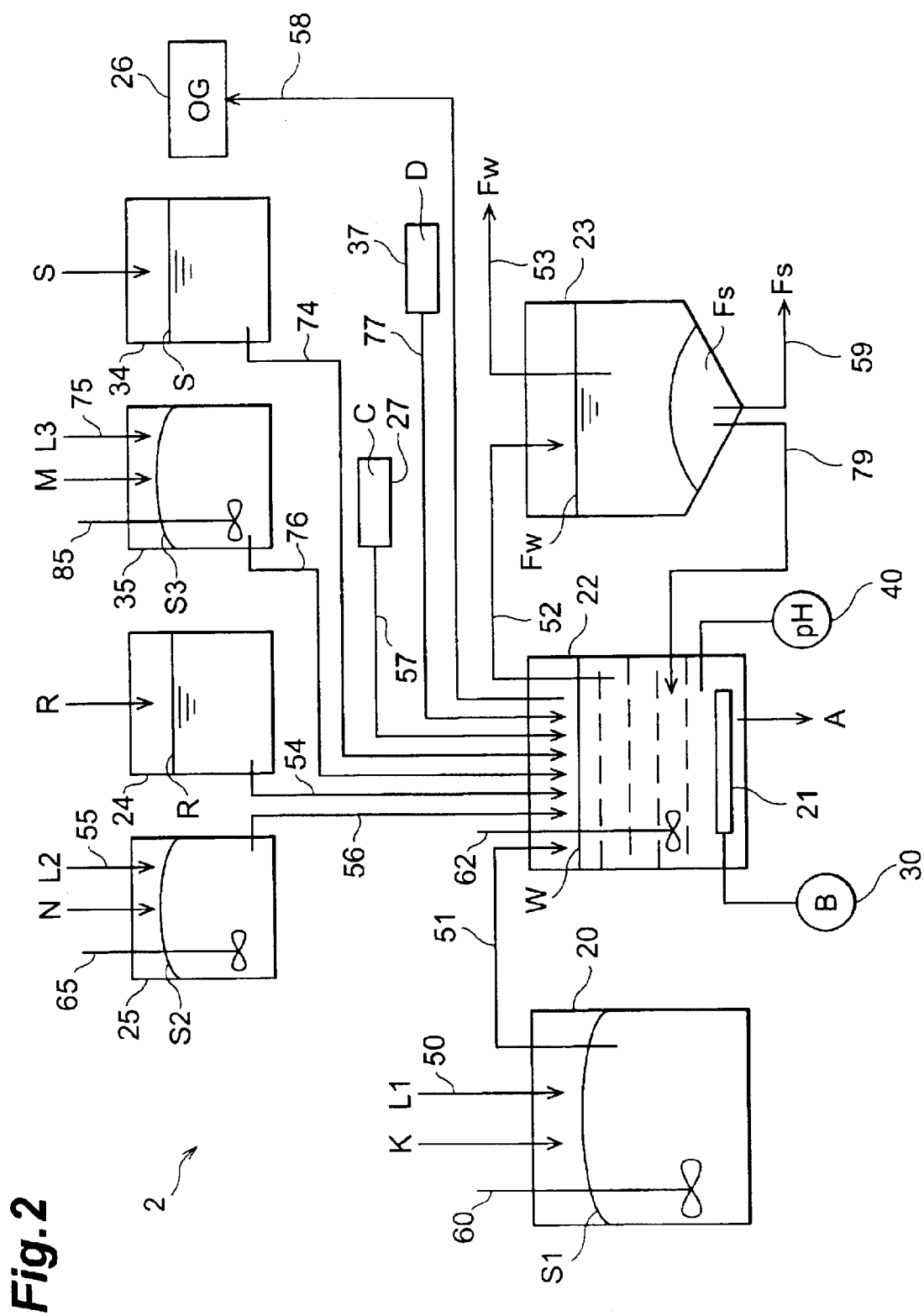
FIG. 2 is a block diagram showing a second embodiment concerning the apparatus for processing an organic chlorine compound in accordance with the present invention.

FIG. 2 is a block diagram showing a second embodiment of the apparatus for processing an organic chlorine compound in accordance with the present invention. The processing apparatus 2 (apparatus for processing the organic chlorine compound) comprises a denitrifying bacteria storage bath 35, a methanol storage bath 34, and an acid storage bath 37 which are connected to the biological treatment bath 22 in addition to the processing apparatus 1 shown in FIG. 1. In this embodiment, the biological treatment bath 22 acts as the aerobic treatment section, anaerobic treatment section, first reaction treatment section, oxidized nitrogen eliminating section, and second reaction treatment section.

The denitrifying bacteria storage bath 35 is used for storing denitrifying bacteria (denitrification bacteria) M (second microorganic body) having a capability of reducing oxidized nitrogen (or nitrogen in ions in a strict sense) such as nitrate ion ($NO_3^-$) and nitrite ion ($NO_2^-$) generated upon the nitrifying reaction caused by the nitrifying bacteria N within the biological treatment bath 22.

A water supply line 75 for supplying culture solution L3 which can culture denitrifying bacteria M is connected to the denitrifying bacteria storage bath 35, whereas the latter is provided with a stirrer 85 for stirring and mixing the denitrifying bacteria M and culture solution L3, so as to yield slurry. Thus, the denitrifying bacteria storage bath 35, culture solution L3, water supply line 75, and stirrer 85 constitute a slurry-forming section.

Also connected to the denitrifying bacteria storage bath 35 is a transfer line 76 for transferring highly fluid slurry S3 obtained upon mixing the denitrifying bacteria M and culture solution L3 to the biological treatment bath 22. Thus, the denitrifying bacteria storage bath 35 and transfer line 76 constitute a second microorganic body adding section.

The methanol storage bath 34 is used for storing methanol S (organic carbon source) which becomes a nutrient for the denitrifying bacteria M, and is provided with a transfer line 74 for supplying the methanol S to the biological treatment bath 22. Thus, the methanol storage bath 34 and transfer line 74 constitute a carbon source adding section.

To the biological treatment bath 22, slurries S1, S2, S3 are supplied from the pretreatment bath 20, nitrifying bacteria storage bath 25, and denitrifying bacteria storage bath 35, respectively, whereas aqueous ammonia R and methanol S are supplied from the ammonia storage bath 24 and methanol storage bath 34, respectively. In the biological treatment bath 22, thus supplied products are stirred and mixed, so as to yield the mixture W (object to be processed).

The acid storage bath 37 is used for storing an acid D to be added for adjusting the pH of mixture W to a value suitable for the biological treatment, and has a transfer line 77 for supplying the acid D to the biological treatment bath 22. Namely, the acid storage bath 37, alkali storage bath 27, and transfer lines 57, 77 constitute a pH adjustment section.

A second embodiment concerning the method of processing an organic chlorine compound in accordance with the present invention carried out by thus configured processing apparatus 2 will now be explained.

First, fly ash K containing dioxins is supplied to the pretreatment bath 20 and, while water L1 is supplied thereto by way of the water supply line 50, the fly ash K and water L1 are fully mixed by the stirrer 60. Consequently, the fly ash K are desalted and washed (desalting step). Subsequently, water L1 in which a salt is dissolved is separated from the fly ash K by sedimentation, filtration, or the like. A part of the water L1 is let out of the pretreatment bath 20 by way of a drain line (not depicted), and the desalted and washed fly ash K is formed into slurry S1 (slurry-forming process).

Preferably, the water L1 injected into the pretreatment bath 20 here is in an amount which can desalt and wash the fly ash K such that the salt concentration in the mixture W having been formed from the object to be processed within the biological treatment bath 22 or the salt concentration in the slurry S1 becomes 4% or lower.

The solid content in the slurry S1, i.e., the content of fly ash K, is adjusted to such a content range within which stirring is possible and gases can easily be supplied. For example, it is preferably adjusted to about 0.5% to 10% by mass if water L1 is used as a mixing medium for slurry S1.

On one hand, while nitrifying bacteria N are introduced into the nitrifying bacteria storage bath 25, culture solution L2 for the nitrifying bacteria N is supplied thereto by way of the water supply line 55. Then, they are stirred and mixed by the stirrer 65, so that the nitrifying bacteria N are formed into highly fluid slurry S2 (slurry-forming process). It will be preferred if nitrifying bacteria N are cultured and acclimatized in the nitrifying bacteria storage bath 25 such that MLVSS becomes preferably 100 mg/l or higher, more preferably 1000 mg/l or higher, and that their nitrifying capability attains an active state of preferably 0.01 kg-N/kg-SS/day or higher, more preferably 0.05 kg-N/kg-SS/day or higher.

On the other hand, while denitrifying bacteria M are introduced into the denitrifying bacteria storage bath 35, culture solution L3 for the denitrifying bacteria M is supplied thereto by way of the water supply line 75. Then, they are stirred and mixed by the stirrer 85, so that the denitrifying bacteria M are formed into highly fluid slurry S3. It will be preferred if denitrifying bacteria M are cultured and acclimatized in the denitrifying bacteria storage bath 35 such that MLVSS becomes preferably 100 mg/l or higher, more preferably 1000 mg/l or higher, and that their nitrifying capability attains an active state of preferably 0.01 kg-N/kg-SS/day or higher, more preferably 0.05 kg-N/kg-SS/day or higher.

As the form of nitrifying bacteria N and denitrifying bacteria M, those in a state where water is eliminated as much as possible from sludge formed like a floc after being cultured and acclimatized beforehand in a culture liquid under a natural or synthetic environment, or in a state in which water is partly eliminated therefrom can be used favorably.

An example of the former is sludge lyophilized into powder. An example of the latter is a dehydrated cake preferably having a moisture content of about 70% by mass or higher obtained after the moisture content in sludge is eliminated by about 30% by mass or less. If the moisture content in the dehydrated cake is less than about 70% by weight, then the cell water of nitrifying bacteria N tends to be eliminated as well.

Also, aqueous ammonia R and methanol S are supplied to and stored in the ammonia storage bath 24 and methanol storage bath 34, respectively. As the aqueous ammonia R and methanol S, those whose concentrations are adjusted beforehand may be supplied to the aqueous ammonia bath 24 and methanol storage bath 34, respectively, or their concentrations may be adjusted after they are supplied to their respective baths 24, 34.

Subsequently, a predetermined amount of slurry S1 is transferred from the pretreatment bath 20 to the biological treatment bath 22. Also, predetermined amounts of nitrifying bacteria N, denitrifying bacteria M, aqueous ammonia R, and methanol S are added to the slurry S1 within the biological treatment bath 22 (first microorganic body adding step, second microorganic body adding step, reduced nitrogen adding step, and carbon source adding step, respectively). Then, they are stirred and mixed by the stirrer 62, so as to yield the mixture W. Thereafter, while stirring is carried out, the blower 30 is driven, so as to send out air to the diffuser tube 21, thereby causing the diffuser tube 21 to jet out fine bubbles of air to the mixture W.

These fine bubbles form a gas/liquid multiphase flow, which sends air to the whole mixture W, so that oxygen is distributed throughout the mixture W, whereby a favorable aerobic atmosphere is formed. Here, it will be preferred if the amount of air supplied from the blower 30 is such that the dissolved oxygen content in the mixture W is preferably 0.5 mg/L or higher. Also, one or more dissolved oxygen concentration meter may be installed in the biological treatment bath 22, so as to monitor the dissolved oxygen concentration in the mixture W.

Once the aerobic atmosphere is formed, oxidization of ammonium ion, i.e., nitrifying reaction represented by expressions (4) and (5), is effected by the nitrifying bacteria N. As a consequence of such a nitrifying reaction, ammonium ion derived from the aqueous ammonia contained in the mixture W is nitrated in an aerobic atmosphere after forming nitrite. Here, a reaction of oxidizing and decomposing dioxins contained in the fly ash K in the mixture W proceeds simultaneously, whereby the dioxins are decomposed into lower hydrocarbon, carbon dioxide, water, and the like (decomposing step).

Here, the pH and changes in pH of the mixture W within the biological treatment bath 22 are monitored by the pH meter 40 installed in the biological treatment bath 22. If the above-mentioned nitrifying reaction is carried out while air is diffused into the mixture W from the diffuser tube 21, the pH of mixture W shifts toward the acidic side as the reaction proceeds. Therefore, according to the actually measured value of pH, alkali C is added to the biological treatment bath 22 from the alkali storage bath 27 by way of the transfer line 57 so as to attain an optimal pH for activating the growth of nitrifying bacteria N, i.e., such that the pH becomes preferably 5 to 9, more preferably 7 to 8. Further, it will be preferred if the temperature of mixture W in the nitrifying reaction is 10 to 40° C.

Preferably, the amount of addition of aqueous ammonia R, which is a supply source of reduced nitrogen, is such a ratio that nitrogen (reduced nitrogen) in aqueous ammonia R is 0.01 to 10.0 g-N with respect to 1 ng of dioxins contained in the fly ash K in slurry S1. Here, aqueous ammonia R may be added continuously or intermittently.

Then, while carrying out the nitrifying reaction of mixture W, a part of the mixture W is sampled periodically, and thus obtained analysis sample A is analyzed, so as to quantitatively determine the concentration of dioxins in the mixture W. After it is verified that the concentration of dioxins has become a target value or lower, the supply of air from the diffuser tube 21 is stopped, so as to terminate the processing for decomposing dioxins along with the nitrifying reaction.

After the diffusion of air, i.e., supply of air, to the mixture W is stopped, the dissolved oxygen remaining in the mixture w is consumed by the nitrifying bacteria N, whereby the mixture W attains therein an anaerobic atmosphere in which the dissolved oxygen concentration is nearly zero. Once the anaerobic atmosphere is thus formed, the denitrifying bacteria M added to the mixture W consume methanol S and carry out a denitrifying reaction for reducing the nitrite ion ($NO_2^-$) and nitrate ion ($NO_3^-$) generated upon the nitrifying reaction caused by the nitrifying bacteria N. Here, it is preferred that an inert gas such as nitrogen gas is supplied to the gaseous phase section of the biological treatment bath 22, so as to replace air. As a consequence, the supply of oxygen from the gaseous section to the mixture W is blocked, whereby the anaerobic atmosphere can be maintained favorably.

Here, the denitrifying bacteria M have a capability of reducing oxidized nitrogen such as nitrite ion ($NO_2^-$) and nitrate ion ($NO_3^-$); and examples thereof include genera of Pseudomonas Achromobacter, Bacillus, and Micrococcus. These denitrifying bacteria M perform respiration by using oxygen in the above-mentioned aerobic atmosphere. In the anaerobic atmosphere, by contrast, they grow by using oxidized nitrogen and nutrients and, at that time, carry out one or both of reactions (referred to as nitrite respiration and nitrate respiration, respectively) represented by the following expressions (6) and/or (7):

$$NO_2^- + 3H^+ \rightarrow 0.5N_2 + H_2O + OH^- \quad (6)$$

$$NO_3^- + 5H^+ \rightarrow 0.5N_2 + 2H_2O + OH^- \quad (7)$$

In this embodiment, methanol S is used as a nutrient, whereby a denitrifying reaction represented by the following expression (8) and/or (9):

$$NO_2^- + \tfrac{1}{2}CH_3OH \rightarrow \tfrac{1}{2}N_2 + \tfrac{1}{2}CO_2 + \tfrac{1}{2}H_2O + OH^- \quad (8)$$

$$NO_3^- + \tfrac{5}{6}CH_3OH \rightarrow \tfrac{1}{2}N_2 + \tfrac{5}{6}CO_2 + \tfrac{7}{6}H_2O + OH^- \quad (9)$$

is carried out. As a consequence of these reactions, the nitrite ion ($NO_2^-$) and nitrate ion ($NO_3^-$) generated upon nitrification are reduced so as to produce nitrogen, carbon dioxide, water, hydroxyl ion, and the like, thereby eliminating the nitrite ion ($NO_2^-$) and nitrate ion ($NO_3^-$) (eliminating step).

The pH and changes in pH of the mixture W within the biological treatment bath 22 are monitored by the pH meter 40 during the denitrifying reaction as well. As mentioned above, the pH of mixture W shifts toward the alkali side as the denitrifying reaction proceeds. Therefore, according to the actually measured value of pH, acid D is added to the biological treatment bath 22 from the acid storage bath 37 by way of the transfer line 77 so as to attain an optimal pH for activating the growth of denitrifying bacteria M, i.e., such that the pH becomes preferably 5 to 9, more preferably 6 to 8 (pH adjusting step). Further, it will be preferred if the temperature of mixture W in the denitrifying reaction is 10 to 40° C.

As the acid D, generally employed inorganic acids, organic acids, and the like can be used. Also, various kinds of buffer solutions may be used at a pH near 7. If organic acids such as acetic acid are used as a nutrient in place of methanol S, these organic acids may also be used as the acid D. If the pH value of mixture W is thus adjusted to the above-mentioned preferable range, then the denitrifying bacteria M are actively grown, and the state where the activity of denitrifying bacteria M is enhanced is maintained. As a result, the decomposing efficiency upon reduction of oxidized nitrogen such as nitrite ion ($NO_2^-$) and nitrate ion ($NO_3^-$) can be kept high.

Preferably, the amount of addition of methanol S, which is a nutrient for the denitrifying bacteria M, is such a ratio that it becomes at least 0.5 mg with respect to 1 mg-N ($NO_2^-$, $NO_3^-$) contained in 1 L of mixture W. If this adding ratio is less than 0.5 mg, then the nitrite respiration or nitrate respiration of the denitrifying bacteria M tends to be carried out insufficiently.

Also, it is desirable that an equivalent is determined beforehand such that methanol S attains the above-mentioned preferable adding ratio. Alternatively, a part of the mixture W may be collected, so as to analyze nitrite ion, nitrate ion, and other nitrogen-containing components. Here, methanol S may be added continuously or intermittently.

The reaction of denitrifying the mixture W is carried out for a predetermined time, so as to terminate the biological treatment of mixture W, and the mixture W is transferred to the solid-liquid separating bath 23 by way of the transfer line 52. In this case, the mixture W may be transferred to the solid-liquid separating bath 23 after the concentration of nitrite ion, nitrate ion, and other nitrogen-containing components in the mixture W is quantitatively determined and seen to be a target value or lower upon analyzing an analysis sample A obtained by periodical sampling of a part of the mixture W.

The gases generated during the processing of mixture W within the biological treatment bath 22 are introduced into the off-gas system 26 by way of the exhaust line 58, so as to carry out exhaust processing. Examples of such gases include the excess of air supplied to the biological treatment bath 22, ammonia gas evaporating from aqueous ammonia R, and carbon dioxide gas, nitrogen gas, and the like which are reaction products.

In the solid-liquid separating bath 23, the mixture W is separated into the processed liquid Fw, which is a supernatant, and the processed solid Fs. By way of the transfer line 53, the processed liquid Fw is sent out to a drain system which is not depicted. On the other hand, a part of the processed solid Fs is let out as surplus sludge from the solid-liquid separating bath 23 by way of the transfer line 59. This surplus sludge can finally be dumped for landfill, or be reused as a resource. On the other hand, the remnant of processed solid Fs is returned to the biological treatment bath 22 as thickened sludge by way of the transfer line 79.

According to the method of processing an organic chlorine compound using the processing apparatus 2 such as the one explained in the foregoing, as in the method of processing an organic chlorine compound using the above-mentioned processing apparatus 1, dioxins can fully be decomposed, without necessitating a severe reaction condition such as high temperature and high pressure in particular, by a processing operation remarkably simpler than conventional ones, whereby the processing cost can drastically be lowered.

Also, since it is wet type processing, the fear of dioxins diffusing to the outside and causing a secondary contamination can fully be prevented from occurring. Also, employed nitrifying bacteria N, denitrifying bacteria M, aqueous ammonia R, methanol S, acid D, and alkali C are inexpensive general-purpose products which are easily available, and conventional complicated, large-size processing apparatus are unnecessary, whereby the spending on equipment and the like can be cut down, so as to further lower the cost.

Further, since the fly ash K, nitrifying bacteria N, and denitrifying bacteria M are used in the form of slurry, it becomes easier for air to be uniformly supplied to their mixture W, and nitrifying bacteria N and oxidases, such as ammonia monooxygenase, produced by the nitrifying bacteria N are more likely to come into contact with dioxins. Hence, the nitrifying reaction caused by nitrifying bacteria N becomes further active, and the decomposition of dioxins can be accelerated.

Furthermore, by a simple processing operation in which methanol S and denitrifying bacteria M are added to and mixed with fly ash K, and then air is blocked under normal temperature and normal pressure, so as to form an anaerobic atmosphere, nitrate ion and nitrite ion which are generated secondarily by the nitrifying reaction upon decomposing dioxins can fully be reduced and can be processed as harmless nitrogen gas. Therefore, the nitrogen concentration of processed liquid Fw can be lowered to such a level that it can be released to the environment.

Also, since the concentration of nitrate ion and nitrite ion in the thickened sludge to be returned is remarkably lowered, the activity of nitrifying bacteria N can be restrained from being lowered by these ions. Therefore, the nitrifying reaction caused by the nitrifying bacteria N can be maintained favorably. As a result, the reaction of decomposing dioxins along with the nitrifying reaction is maintained more favorably, whereby the decomposing efficiency of dioxins can be improved.

Figure 3:
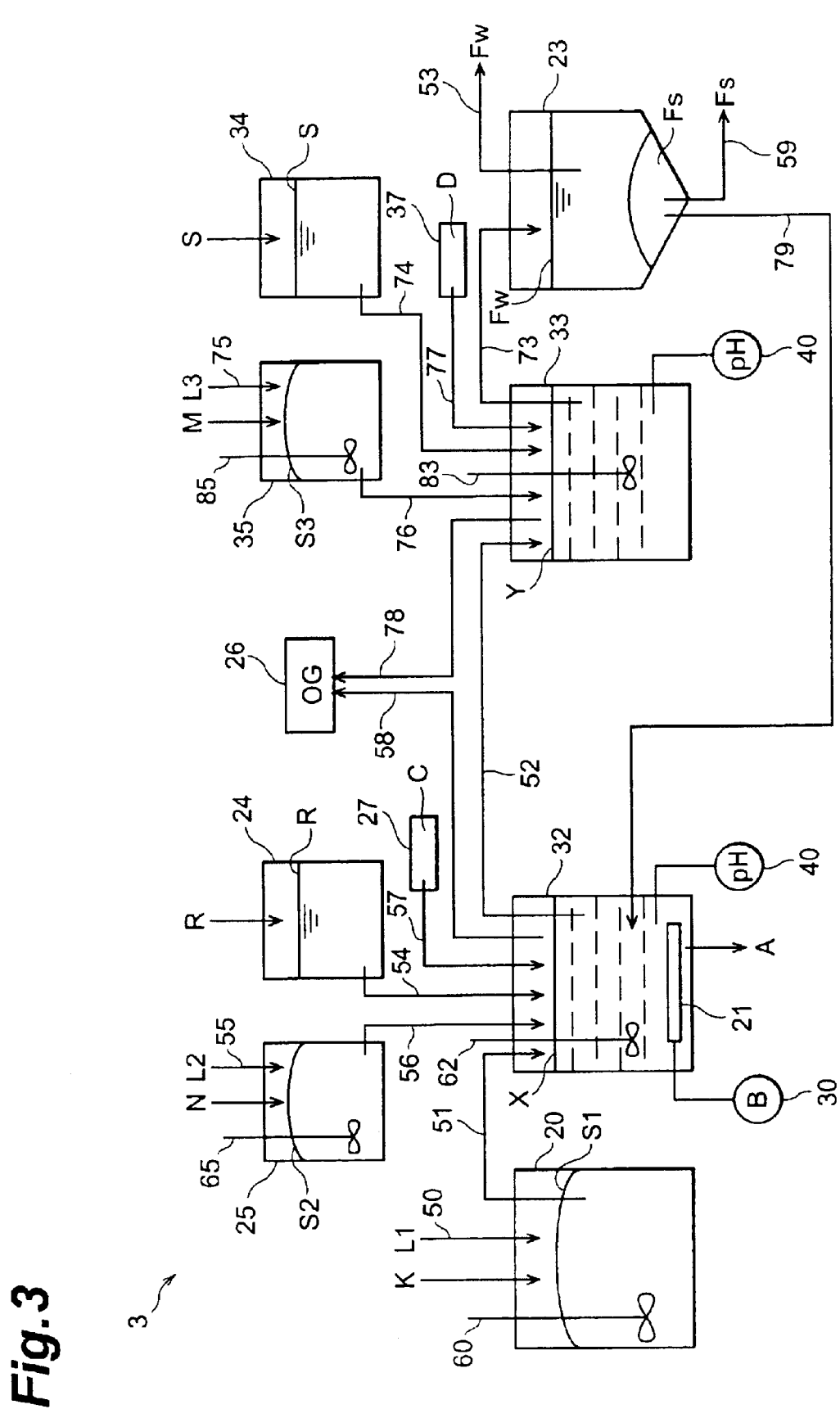
FIG. 3 is a block diagram showing a third embodiment concerning the apparatus for processing an organic chlorine compound in accordance with the present invention.

FIG. 3 is a block diagram showing a third embodiment of the apparatus for processing an organic chlorine compound in accordance with the present invention. The processing apparatus 3 (apparatus for processing the organic chlorine compound) comprises a nitrifying bath 32 for carrying out nitrification processing of a mixture X in which slurry S2 of nitrifying bacteria N and aqueous ammonia R are mixed with slurry s of fly ash K, and a denitrifying bath 33 for carrying out denitrification processing of a mixture Y in which slurry 53 of denitrifying bacteria M and methanol S are mixed with the mixture X transferred from the nitrifying bath 32. Thus, the nitrifying bath 32 and denitrifying bath 33 form a reaction treatment section.

Connected to the nitrifying bath 32 are a pretreatment bath 20, a nitrifying bacteria storage bath 25, an ammonia storage bath 24, and an alkali storage bath 27. Connected to the denitrifying bath 33, on the other hand, are a denitrifying bacteria storage bath 35, a methanol storage bath 34, an acid storage bath 37, and a solid-liquid separating bath 23. The nitrifying bath 32 and denitrifying bath 33 are connected to each other by way of a transfer line 52, through which the mixture X is supplied from the nitrifying bath 32 to the denitrifying bath 33. While the nitrifying bath 32 has a diffuser tube 21, the denitrifying bath 33 is provided with no diffuser tube.

A third embodiment concerning the method of processing an organic chlorine compound in accordance with the present invention will now be explained. First, in the nitrifying bath 32, addition of aqueous ammonia R and pH adjustment are effected while air is diffused into the mixture X from the diffuser tube 21, and the nitrifying reaction of the above-mentioned expressions (4) and (5) is carried out in an aerobic atmosphere with stirring caused by a stirrer 62. As a consequence, dioxins are sufficiently decomposed along with the nitrification processing.

Subsequently, the mixture X containing nitrate ion and nitrite ion (oxidized nitrogen), subjected to the nitrifying reaction, is transferred to the denitrifying bath 33, and denitrifying bacteria M are added thereto, so as to yield the mixture Y. While the supply of air is blocked, addition of methanol S and pH adjustment are performed, and the denitrifying reaction of the above-mentioned expressions (8) and (9) is carried out in an anaerobic atmosphere with stirring caused by a stirrer 83. As a consequence, nitrate ion and nitrite ion are reduced, whereby the nitrogen concentration in the mixture Y is greatly lowered.

The nitrogen gas and carbon dioxide gas generated upon the denitrifying reaction are sent to an off-gas system 26 by way of an exhaust line 78. On the other hand, new slurry S1 of fly ash K is supplied to the nitrifying bath 32 from the pretreatment bath 20, and nitrification processing in the nitrifying bath 32 is carried out in parallel with the denitrification processing in the denitrifying bath 33.

Subsequently, after the completion of denitrification processing, the mixture Y is transferred to the solid-liquid separating bath 23. If the nitrification processing in the nitrifying bath 32 has ended by this time, the mixture X is transferred to the denitrifying bath 33 from the nitrifying bath 32, and new slurry S1 of fly ash K is transferred from the pretreatment bath 20 to the nitrifying bath 32. Then, the nitrification processing, denitrification processing, and solid-liquid separation processing are carried out in parallel in the nitrifying bath 32, denitrifying bath 33, and solid-liquid separating bath 23, respectively. A part of the processed solid Fs isolated by the solid-liquid separating bath 23 is returned as thickened sludge to the nitrifying bath 32 by way of a transfer line 79.

The method of processing an organic chlorine compound using such a processing apparatus 3 enables continuous processing of fly ash K as the object to be processed, so as to improve the processing efficiency, whereby the processing amount (throughput) can be enhanced. Also, the decomposing efficiency of dioxins can be made as high as or higher than that in the method of processing an organic chlorine compound using the processing apparatus 1.

Figure 4:
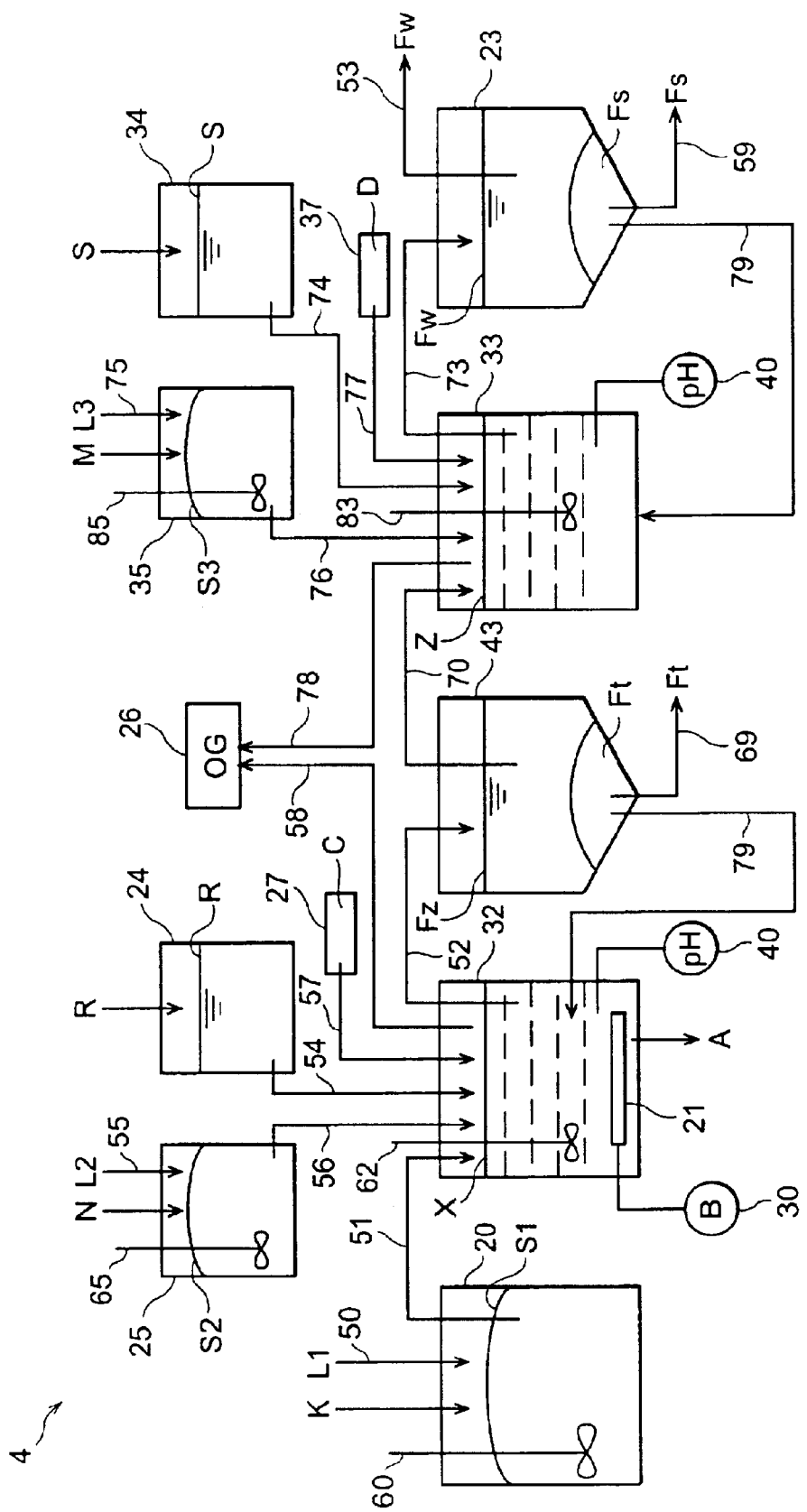
FIG. 4 is a block diagram showing a fourth embodiment concerning the apparatus for processing an organic chlorine compound in accordance with the present invention.

FIG. 4 is a block diagram showing a fourth embodiment of the apparatus for processing an organic chlorine compound in accordance with the present invention. The processing apparatus (apparatus for processing the organic chlorine compound) is configured such that a solid-liquid separating bath 43 is disposed between the nitrifying bath 32 and denitrifying bath 33 in the processing apparatus 3 shown in FIG. 3.

In the processing apparatus 4, the mixture X having been subjected to nitrification processing in the nitrifying bath 32 is transferred to the solid-liquid separating bath 43 by way of a transfer line 52. The mixture X is separated into the processed liquid Fz and processed solid Ft by gravity sedimentation or the like. At this time, nitrification processing of new slurry S1 of fly ash K can be carried out in the nitrifying bath 32 in parallel therewith. Subsequently, the processed liquid Fz is supplied to the denitrifying bath 33 by way of a transfer line 70. On the other hand, a part of the processed solid Ft is let out as surplus sludge, whereas the remnant of processed solid Ft is returned as thickened sludge to the nitrifying bath 32.

The processed liquid Fz contains the nitrate ion and nitrite ion (oxidized nitrogen) generated upon the nitrifying reaction. In the denitrifying bath 33, denitrifying bacteria M are added to the processed liquid Fz, so as to yield the mixture Z, in which addition of methanol S and pH adjustment are carried out, and denitrification processing is effected in an anaerobic atmosphere with stirring. At this time, the nitrification processing of new slurry S1 of fly ash K and solid-liquid separation of new mixture X can be carried out in parallel therewith in the nitrifying bath 32 and solid-separating bath 43, respectively.

Thereafter, the mixture Z having been subjected to the denitrification processing is sent to the solid-liquid separating bath 23 by way of a transfer line 73, so as to be separated into the processed liquid Fw and processed solid Fs. A part of the processed solid Fs is returned as thickened sludge to the denitrifying bath 33.

The method of processing an organic chlorine compound using thus configured processing apparatus 4 also enables continuous processing of fly ash K, so as to improve the processing efficiency, whereby the processing amount (throughput) can be enhanced.

Figure 5:
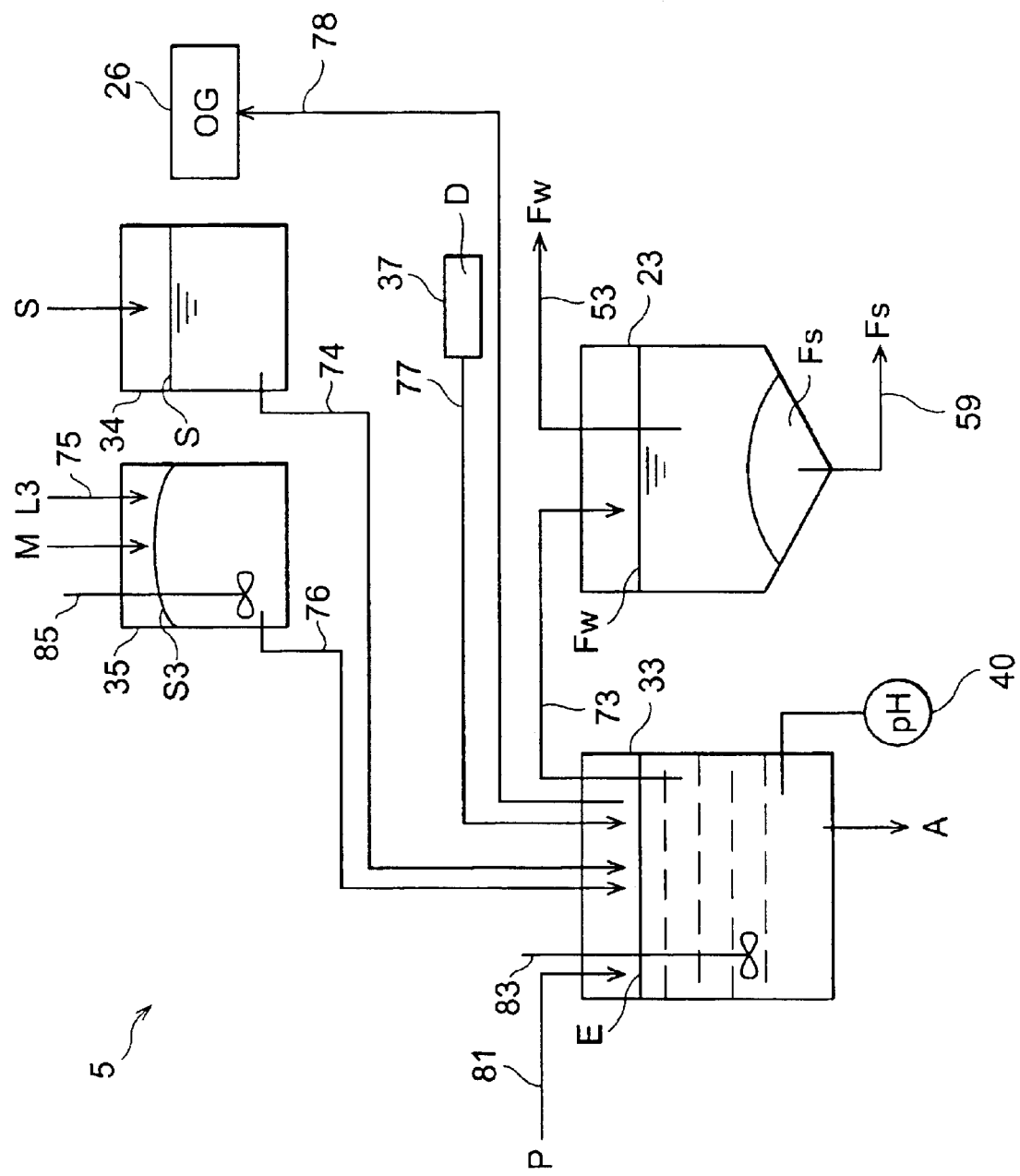
FIG. 5 is a block diagram showing a fifth embodiment concerning the apparatus for processing an organic chlorine compound in accordance with the present invention.

FIG. 5 is a block diagram showing a fifth embodiment of the apparatus for processing an organic chlorine compound in accordance with the present invention. The processing apparatus 5 (apparatus for processing the organic chlorine compound) is configured in the same manner as the processing apparatus 3 shown in FIG. 3 except for lacking the pretreatment bath 20, ammonia storage bath 24, nitrifying bacteria storage bath 25, alkali storage bath 27, and processed solid (return sludge) transfer line 79. Also connected to the denitrifying bath 33 (reaction treatment section) is a transfer line 81 for transferring biological sludge P (object to be processed) containing nitrifying bacteria subjected to an aerobic treatment of waste water containing nitrogen, such as leachate, whereas a sampling line for analysis sample A is further provided therewith.

A fifth embodiment concerning the method of processing an organic chlorine compound in accordance with the present invention using this processing apparatus 5 will now be explained. First, biological sludge P from a biological treatment process is supplied into the denitrifying bath 33, a predetermined amount of methanol S is added thereto (carbon source adding step), denitrifying bacteria M are further added thereto if necessary (second microorganic body adding step), and they are mixed. The biological sludge P often contains oxidized nitrogen, such as nitrate ion and nitrite ion, which are originally contained in waste water and the like or generated due to activities of nitrifying bacteria in the preceding biological treatment under an aerobic condition.

Subsequently, the pH of thus obtained mixture E is adjusted, and the denitrifying reaction of the above-mentioned expressions (8) and (9) is carried out in an anaerobic atmosphere with stirring caused by the stirrer 83. Consequently, the oxidized nitrogen contained in the biological sludge P is reduced and eliminated (eliminating step). As a result, the nitrogen concentration in the mixture E is greatly lowered (oxidized nitrogen eliminating process). Here, the nitrogen gas and carbon dioxide gas generated upon the denitrifying reaction are sent to the off-gas system 26 by way of the exhaust line 78.

Then, the supply of methanol S is stopped, so as to maintain an anaerobic atmosphere within the denitrifying bath 33 (anaerobic treatment process). As a consequence, the nitrifying bacteria contained in the biological sludge S of mixture E are disassembled. Here, the biological sludge P often contains organic chlorine compounds, such as dioxins, contained in the waste water in the preceding biological treatment process. In this embodiment, dioxins are decomposed as nitrifying bacteria are disassembled.

Though details of the mechanism of decomposing dioxins have not been elucidated, it is presumed that, for example, an oxidase, such as oxygenase, produced by nitrifying bacteria in the aerobic treatment is eluted from the nitrifying bacteria as the latter are disassembled under the anaerobic condition, whereby the dioxins are oxidized and decomposed by an enzymatic reaction in which this oxidase involves. Also, it is presumed that, if oxidized nitrogen remains or exists in the biological sludge P, then the activity of denitrifying bacteria contained in the biological sludge P is maintained, so that the disassembling of nitrifying bacteria is suppressed under the influence thereof, whereby the elution of oxidase is stagnated. However, the action is not restricted thereto.

The processing temperature of mixture E in the anaerobic treatment process is held preferably at 15° C. or higher, more preferably at 18° C. or higher. If this processing temperature is lower than 15° C., then the decomposition of organic chlorine compound tends to be harder to proceed. Preferably, the denitrifying bath 33 is formed from a light-shielding material.

Subsequently, the decomposition of dioxins due to the anaerobic treatment in the denitrifying bath 33 is terminated, and then the mixture E is transferred to the solid-liquid separating bath 23 by way of the transfer line 73. Here, the termination of treatment may be defined according to a preset processing time or determined by analyzing the analysis sample A for the mixture E and verifying that the concentration of dioxins in the mixture E has become a target value or lower.

Then, the mixture E is subjected to solid-liquid separation in the solid-liquid separating bath 23, so as to be separated into the processed liquid Fw and processed solid Fs. The processed liquid Fw is sent out to a drain system, which is not depicted, by way of the transfer line 53. On the other hand, the processed solid Fs is let out as surplus sludge by way of the transfer line 59. This surplus sludge can finally be dumped for landfill, or be reused as a resource.

According to the method of processing an organic chlorine compound using such a processing apparatus 5, dioxins can easily be decomposed and eliminated if only the oxidized nitrogen in the biological sludge P is eliminated and its anaerobic state is kept. Also, since dioxins can be decomposed and eliminated under a very mild condition, the cost needed for apparatus and operation can be lowered remarkably. Further, since it is not necessary for the biological sludge P to be newly subjected to aerobic processing, the process and apparatus configuration can be made simpler, and the cost can be made lower.

Figure 6:
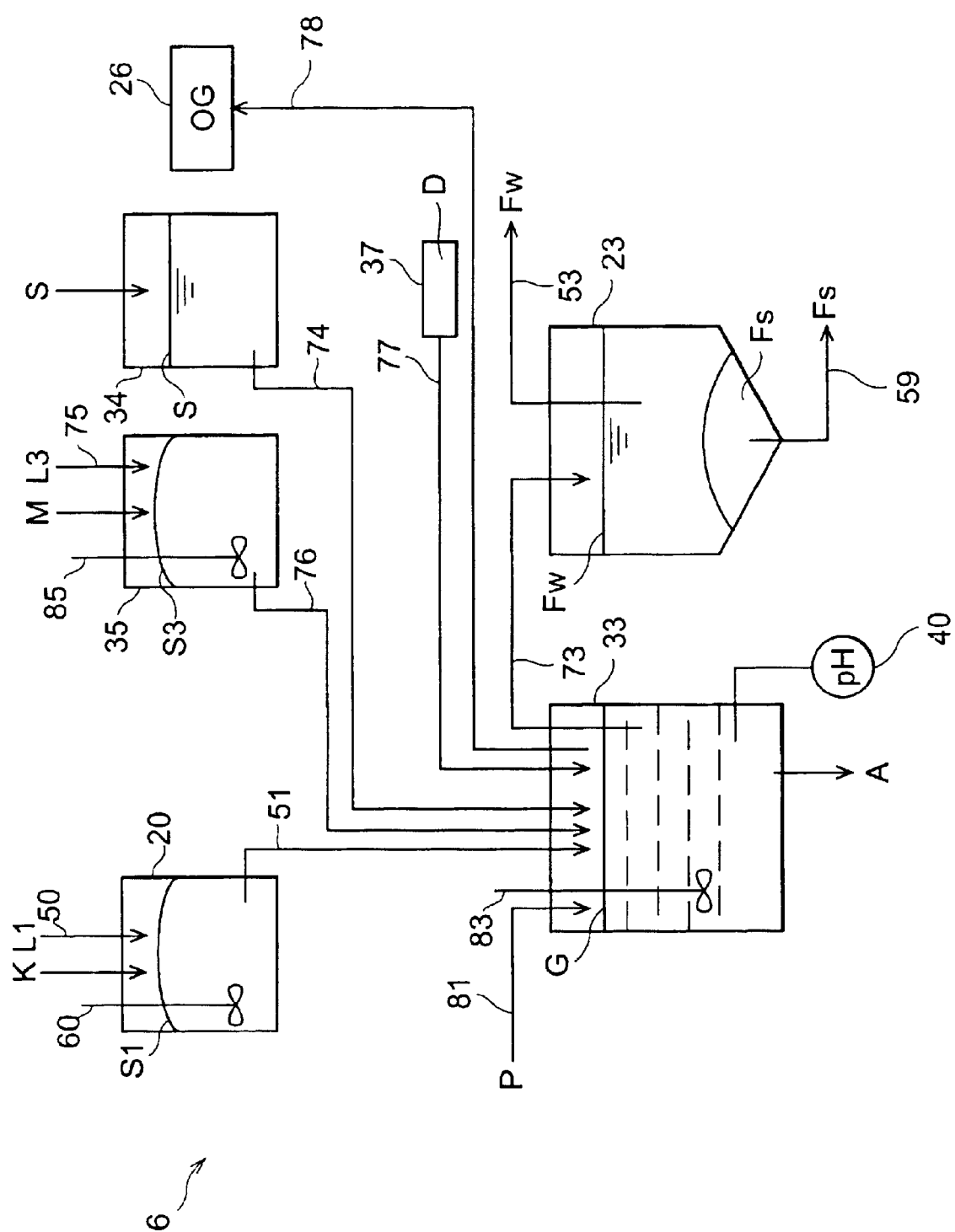
FIG. 6 is a block diagram showing a sixth embodiment concerning the apparatus for processing an organic chlorine compound in accordance with the present invention.

FIG. 6 is a block diagram showing a sixth embodiment of the apparatus for processing an organic chlorine compound in accordance with the present invention. The processing apparatus 6 (apparatus for processing the organic chlorine compound) is configured such that a pretreatment bath 20 is connected to the denitrifying bath 33 of the processing apparatus 5 shown in FIG. 5. As a sixth embodiment of the method of processing an organic chlorine compound in accordance with the present invention, the following procedure will be noted.

First, biological sludge P from a biological treatment process is supplied into the denitrifying bath 33, a predetermined amount of methanol S is added thereto (carbon source adding step), denitrifying bacteria M are further added thereto if necessary (second microorganic body adding step), and they are mixed. Subsequently, the pH of thus obtained mixture G is adjusted, and the denitrifying reaction of the above-mentioned expressions (8) and (9) is carried out in an anaerobic atmosphere with stirring caused by the stirrer 83. Consequently, the oxidized nitrogen, such as nitrate ion and nitrite ion, contained in the biological sludge P is reduced and eliminated (eliminating step). Also, the nitrogen gas and carbon dioxide gas generated upon the denitrifying reaction are sent to the off-gas system 26 by way of the exhaust line 78.

Next, the supply of methanol S is stopped, slurry S1 containing fly ash K is supplied from the pretreatment bath 20 to the denitrifying bath 33 (object to be processed mixing process), and the slurry S1 is mixed with the mixture G from which oxidized nitrogen is eliminated. Then, an anaerobic atmosphere is maintained within the denitrifying bath 33 (anaerobic treatment process). As a consequence, the nitrifying bacteria contained in the biological sludge P of mixture G are disassembled, whereby the decomposition of dioxins, supposed to be caused by an enzymatic reaction in which oxidases eluted from the nitrifying bacteria is involved, is carried out. Here, not only the dioxins contained in the biological sludge P, but also those contained in the slurry S1 including ash K are decomposed.

Subsequently, the decomposition of dioxins due to the anaerobic treatment in the denitrifying bath 33 is terminated, and then the mixture X is transferred to the solid-liquid separating bath 23 by way of the transfer line 73. Thereafter, the mixture X is subjected to solid-liquid separation in the solid-liquid separating bath 23, so as to be separated into the processed liquid Fw and processed solid Fs. The processed liquid Fw is sent out to a drain system, which is not depicted, by way of the transfer line 53. On the other hand, the processed solid Fs is let out as surplus sludge by way of the transfer line 59.

According to the method of processing an organic chlorine compound using such a processing apparatus 6, dioxins can easily be decomposed and eliminated under a very mild condition if only the oxidized nitrogen in the biological sludge P is eliminated and its anaerobic state is kept. As a consequence, the cost needed for apparatus and operation can fully be lowered. Also, in addition to dioxins contained in biological sludge P, those contained in fly ash K can be subjected to the decomposing processing by an anaerobic treatment process alone. Thus, it is advantageous in that the object other than biological sludge P can also be processed easily and favorably.

Here, slurry S1 containing fly ash K may also be supplied to the denitrifying bath 33 when the biological sludge P is supplied to the denitrifying bath 33. Namely, slurry S1 may also be supplied in the oxidized nitrogen eliminating process. In this manner, when slurry S1 contains oxidized nitrogen, the latter can be eliminated prior to the anaerobic treatment process. Therefore, the decomposing efficiency of dioxins in the anaerobic treatment process can be improved.

Figure 7:
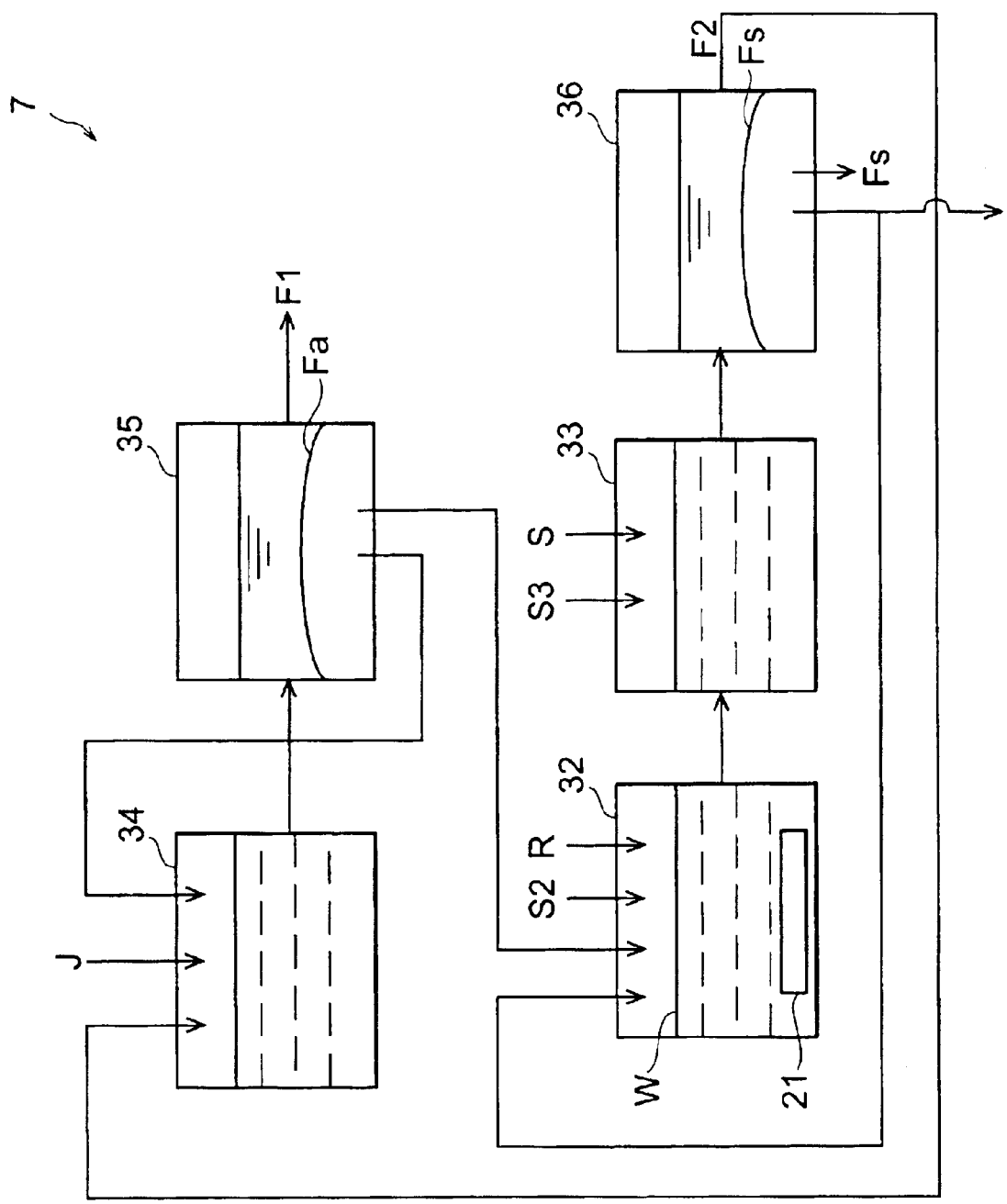
FIG. 7 is a block diagram showing a seventh embodiment concerning the apparatus for processing an organic chlorine compound in accordance with the present invention.

FIG. 7 is a block diagram showing a seventh embodiment concerning the apparatus for processing an organic chlorine compound in accordance with the present invention. The processing apparatus 7 (apparatus for processing the organic chlorine compound) comprises a biological treatment bath 34 to which waste water J as an object to be processed containing nitrogen or the like is supplied, and a sludge separating bath 35, a nitrifying bath 32, a denitrifying bath 33, and a sludge separating bath 36, which are successively disposed at downstream the biological treatment bath 34.

In the biological treatment bath 34, a normal biological treatment of waste water J is carried out by biological sludge. The sludge separating bath 35 is used for carrying out solid-liquid separation of the mixture of waste water J and biological sludge transferred from the biological treatment bath 34. On the other hand, the sludge separating bath 36 is used for carrying out solid-liquid separation of the mixture W transferred from the denitrifying bath 33.

A seventh embodiment concerning the method of processing an organic chlorine compound in accordance with the present invention using thus configured processing apparatus 7 will now be explained. First, waste water J of dioxins is supplied to the biological treatment bath 34. In the case where sludge having a sufficient activity is not contained in the waste water J, other kinds of sludge such as coagulated sludge and calcium carbonate ($CaCO_3$) sludge may be added to and mixed with this waste water J.

Then, a biological treatment of the waste water J is effected, and the mixture of processed waste water J and sludge is transferred to the sludge separating bath 35, so as to carry out solid-liquid separation. The resulting supernatant is let out as processed water F1, whereas a part of the processed solid Fa is returned as return sludge to the biological treatment bath 34. On the other hand, the remnant of processed solid Fa is transferred to the nitrifying bath 32. The waste water J and the dioxins contained in SS or the like in waste water J tend to be transferred to and contained in the processed solid Fa.

Next, slurry S2 containing nitrifying bacteria and aqueous ammonia R as reduced nitrogen are added to and mixed with the processed solid Fa accommodated in the nitrifying bath 32, so as to yield a mixture W. Air is diffused from the diffuser tube 21 into the mixture W, so as to form an aerobic atmosphere, and nitrifying bacteria are caused to effect the reaction of the above-mentioned expressions (4) and (5), thereby oxidizing the reduced nitrogen. Here, dioxins are decomposed as reduced nitrogen is oxidized (aerobic treatment process).

Subsequently, the mixture W subjected to the aerobic treatment process is transferred from the nitrifying bath 32 to the denitrifying bath 33. Further, slurry S3 containing denitrifying bacteria and methanol S as an organic carbon source are added to the mixture W accommodated in the denitrifying bath 33, and they are stirred while forming an anaerobic atmosphere. As a consequence, the oxidized nitrogen contained in the mixture W beforehand and the oxidized nitrogen generated upon the aerobic treatment in the nitrifying bath 32 are reduced and eliminated (oxidized nitrogen eliminating process).

Depending on the processing time in the nitrifying bath 32 and the like, the dioxins in mixture W may not be decomposed in the aerobic treatment process, which leaves a slight amount of dioxins. Therefore, the supply of methanol S, which becomes a nutrient for denitrifying bacteria, is subsequently stopped, so as to keep an anaerobic atmosphere within the denitrifying bath 33. It is presumed that, as a consequence, the disassembling of nitrifying bacteria proceeds, an oxidase is eluted from bacteria bodies, and dioxins are oxidized and decomposed due to the action of this oxidase.

Thereafter, the mixture W having fully decomposed dioxins is transferred to the sludge separating bath 36. Here, the solid-liquid separation of mixture W is carried out, and processed water F2 as clarified water is returned to the biological treatment bath 34. Also, a part of the processed solid Fs separated from the clarified water is transferred as return sludge to the nitrifying bath 32. Further, the remnant of processed solid Fs is let out of the system as surplus sludge.

Thus configured processing apparatus 7 makes it possible for dioxins to hardly remain in the surplus sludge (a part of the processed solid FS) that is let out of the system of the processing apparatus 7. Also, the concentration of dioxins in the processed water F1, F2 can be lowered remarkably. Further, since dioxins are decomposed in both of the nitrifying bath 32 and denitrifying bath 33, the concentration of dioxins can further be lowered in the surplus sludge and processed water F1, F2, and the processing efficiency can be enhanced.

In the processing apparatus 1, plural of biological treatment baths 22 may be disposed, so as to be connected to one another. In this manner, the processing of the object to be processed can simulate continuous processing. Examples of the object to be processed other than fly ash K may include main ash, soil, those burned but not incinerated, and the like. If such a solid has a size greater than about 3 mm, it is desirably introduced into the pretreatment bath 20 after its particle size is reduced to 3 mm or less, preferably 0.1 mm or less by use of known means such as crushing, sieving (sizing), and sedimentation. As a consequence, it becomes easier for the solid and water L1 to get miscible with each other, whereby slurry is formed more easily.

The object to be processed in each embodiment may be waste water containing suspended matters incurring a possibility of containing dioxins and the like, such as liquid products like leachate, waste water, and the like from waste disposal facilities, for example. In this case, since dioxins are hard to dissolve, they are considered to be adhered to the solid such as suspended matter or be suspended like colloid, rather than be eluted to water. If the solid such as suspended matter has already become slurry, it is not necessary to add water L1 thereto for forming slurry.

If the original salt concentration of the object to be processed is 4% or less, then desalting is not always necessary, and water L1 for desalting may not be supplied. At the time of nitrifying treatment, stirring effects can also be obtained by diffusing from the diffuser tube 21 alone without driving the stirrer 62.

Instead of water L1, other liquids may be used. In this case, it will be sufficient if the solid content in slurry S1 is within such a range where the slurry S1 can be stirred and gases can be supplied favorably. As the nitrifying bacteria N and denitrifying bacteria M, those purely cultured may also be used, respectively.

Fixative microorganic bodies attached to fillers, carriers, and flocs can also be utilized. If nitrifying bacteria N having acclimatized beforehand to organic chlorine compounds such as dioxins are used, then the time required for the nitrifying bacteria N to adapt to the environment is shortened, whereby the decomposing efficiency of the organic chlorine compounds contained in the object to be processed is enhanced. Similarly, denitrifying bacteria M may also be acclimatized to the environment of use.

The nitrifying bacteria N are not restricted to the above-mentioned genera of Nitrosomonas, Nitrosococcus, Nitrosospira, Nitrosocystis, Nitrobacter, and Nitrocystis. Though these nitrifying bacteria N are autotrophs which do not require organic substances for synthesizing their own cells, they may also be heterotrophs which necessitate organic substances for synthesizing their own cells. In the latter case, methanol S and other organic carbon sources, for example, can become nutrients for the nitrifying bacteria N. On the other hand, the denitrifying bacteria M are not restricted to the above-mentioned genera of Pseudomonas Achromobacter, Bacillus, and Micrococcus.

Not only aqueous ammonia R, but also ammonium salts such as ammonium sulfate or the like, urea, nitrogen-containing amino acids, and so forth, for example, are favorably used as the source for supplying reduced nitrogen. As mentioned above, not only methanol S, but also organic acids such as acetic acid or various kinds of organic substances may be used as the organic carbon source. If a sufficient amount of reduced nitrogen and/or organic carbon source originally exists in an object to be processed such as fly ash K, then it is not always necessary for them to be newly added to the object to be processed.

The nitrifying bacteria N and/or denitrifying bacteria M may also be used in the form of dehydrated cake, powder, or the like without forming slurry. In this case, operations for adding them to the object to be processed become relatively easier, and the storage baths 25, 35 for microorganic bodies can be made smaller. Each of the nitrifying bacteria N, denitrifying bacteria M, aqueous ammonia R, methanol S, alkali C, and acid D may manually be added to slurry S1 of fly ash K as well.

It is not always necessary for the pretreatment bath 20, biological treatment bath 22, nitrifying bath 32, denitrifying bath 33, and solid-liquid separating baths 23, 36, 43 to be disposed separately, and their functions may be realized in a single bath with time. The processing of fly ash K in the processing apparatus 2, by way of example, may be configured such that fly ash K from which foreign matters and contaminants have been eliminated is supplied into the biological treatment bath 22; water is added thereto and mixed therewith, so as to yield slurry S1; then slurry S2 of nitrifying bacteria N, slurry S3 of denitrifying bacteria M, aqueous ammonia R, and methanol S are added thereto, so as to form the mixture W, which is reacted while air is diffused therein; and, after the completion of reaction, the solid in the mixture W is sedimented, so as to separate and eliminate the supernatant. A similar processing operation can be repeated with fly ash K added to the biological treatment bath 22.

If the solid content is raised while repeating the processing operation for some times, so that the fluidity is worsened, then the processing operation may be restarted after the solid is eliminated. Also, after fly ash K, which is a solid, nitrifying bacteria N and denitrifying bacteria M in the form of moisture-containing cake, powder, or the like, aqueous ammonia R, and methanol S are mixed within the biological treatment bath 22, water L1 and culture solutions L2, L3 may be added thereto, so as to form slurry upon stirring and mixing. Such a slurry forming method is also applicable to the nitrifying bath 32 and denitrifying bath 33 in the processing apparatus 3 to 6. The culture solutions L2, L3 may be identical to each other. In the processing apparatus 7, sludge may directly be sent back to the nitrifying bath 32 from the denitrifying bath 33.

As the solid-liquid separating means, membrane elements which can filtrate the mixture W, so as to yield processed liquids Fw, F1, F2 may also be used. Examples of membrane elements include reverse osmosis (RO) membranes, ultrafiltration (UF) membranes, microfiltration (MF) membranes, and hollow fiber (HF) membranes, whereas membrane modules in which these membrane elements are multilayered or integrated can favorably be used.

EXAMPLES

Though specific examples concerning the present invention will be explained in the following, the present invention is not restricted thereto as long as the gist thereof is not exceeded.

Example 1

A precipitate collected from a disposal facility for general waste leachate was filtrated with a stainless net beforehand, so as to remove contaminants, and then was put into a stainless container having a volume of 20 L (liters), in which biological sludge containing nitrifying bacteria of Nitrosomonas genus or the like was added thereto and mixed therewith, so as to yield a liquid mixture sample having a total amount of 18 L. The mixture sample was continuously stirred by a stirrer while air was diffused therein. Initially, the mixture sample exhibited a suspended solid concentration of 8100 mg/L and a salt concentration of 1.2%. Into this container, urea was supplied and mixed at a rate of 7.7 g/day, and processing was carried out for 11 days while pH was automatically adjusted to about 7 (neutral) with sodium hydroxide.

The average processing conditions during this time were temperature of 18 to 20° C., nitrogen volume load of 0.20 kg-N/m$^3$/day, its sludge load of 0.025 kg-N/kg-SS/day, urea-derived organic carbon volume load of 0.086 kg-C/m$^3$/day, and its sludge load of 0.011 kg-C/kg-SS/day. Here, "kg-C" indicates that it is a weight of organic carbon.

Subsequently, the concentration of dioxins contained in the mixture sample was quantitatively determined before and after the processing in Example 1. Upon quantitative determination, the content (concentration) of a part of each homologue of PCDDs and PCDFs per dried solid weight was determined by a high-resolution gas chromatograph/high-resolution mass spectrometer (HRGC/HRMS) in conformity to a manual of Ministry of Health and Welfare (notified on Feb. 26, 1997). Also, thus obtained respective contents of individual homologues per dried solid weight were summed, so as to determine the total value (total value of tetra- to octa-chlorinated PCDDs and PCDFs, ditto in the following).

The results of quantitative determination are shown in Table 1 as actually measured values without toxic equivalency conversion. The prefixes "T4," "P5," "H6," "H7," and "O8" for compound names in the table indicate homologues having 4 to 8 chlorine atoms combined to each molecular skeleton of dioxins, respectively.

TABLE 1

| Example Dioxins | | Concentration before processing [pg/g] | Concentration after processing [pg/g] |
|---|---|---|---|
| PCDDs | T4CDDs | 110 | 16 |
| | P5CDDs | 190 | 26 |
| | H6CDDs | 370 | 63 |
| | H7CDDs | 280 | 60 |
| | O8CDD | 190 | 60 |
| PCDFs | T4CDFs | 270 | 57 |
| | P5CDFs | 290 | 53 |
| | H6CDFs | 330 | 43 |
| | H7CDFs | 240 | 22 |
| | O8CDF | 150 | 25 |
| Total | | 2,420 | 425 |

From Table 1, the total amount of contents of dioxins per dried solid weight before the processing was 2420 pg/g as the actually measured value (37 pg-TEQ/g as the toxic equivalency quantity). By contrast, the total amount after the processing was 425 pg/g as the actually measured value (5 pg-TEQ/g as the toxic equivalency quantity).

From this result, it has been verified that the ratio of eliminating dioxins was very high, i.e., 82.4% as actually measured value, and 86.5% as toxic equivalency quantity. It has also been elucidated that all the homologues of PCDDs and PCDFs subjected to quantitative determination were fully decomposed at high efficiencies. From these facts, it has been verified that dioxins in the object to be processed can fully be decomposed and eliminated in accordance with the present invention.

Comparative Example 1

The precipitate used in Example 1 was processed for the same days in the same manner as Example 1 except neither biological sludge nor urea was added thereto. The content of dioxins hardly changed between before and after the processing.

Example 2

The processing was effected in the same manner for the same period of days as Example 1 except that the equivalent amount of aqueous ammonia was used instead of urea used in Example 1. As a result, it was verified that a sufficient effect of decomposing dioxins was obtained substantially as in Example 1.

Example 3

Biological sludge containing nitrifying bacteria such as Nitrosomonas genus and denitrifying bacteria such as Pseudomonas Achromobacter genus were added to and mixed with sludge containing dioxins collected from a leachate treatment process, so as to yield a mixture. This mixture was accommodated in a container acting as a biological treatment bath, and urea as reduced nitrogen was continuously added thereto while air was diffused into the sample. After the nitrifying treatment was carried out for 10 days in this state, the diffusing of air was stopped, and methanol as an organic carbon source was continuously added thereto, while nitrogen ($N_2$) gas was supplied to the gaseous phase in the container, with stirring and mixing effected by a stirrer. Then, in this state, a denitrifying treatment was carried out for 10 days.

The processing conditions at this time are as follows:
(1) Mixture: 18 L (container volume: 25 L), suspended solid concentration=6500 mg/L
(2) Nitrifying treatment: pH=7.5 to 8.0, amount of added urea=6.6 g/d
(3) Denitrifying treatment: pH=6.5 to 7.5, amount of added methanol=6.1 g/d Next, the concentration of dioxins contained in sludge in the mixture was analyzed before and after the processing in Example 3. The subject of analysis was the total amount of polychlorinated dibenzoparadioxins (PCDDs), polychlorinated dibenzofurans (PCDFs), and coplanar polychlorinated biphenyls (coplanar PCBs). Individual homologues were quantitatively determined by a high-resolution gas chromatograph/high-resolution mass spectrometer (HRGC/HRMS) in conformity to Japanese Industrial Standard JIS K0312 (1999), and were summed, so as to yield the actually measured value of total concentration of all the dioxins.

Also, the nitrogen component concentration contained in the filtrate (filtrate obtained by a 0.45-$\mu$m membrane filter) in the sample was analyzed and measured before and after the processing in Example 3. As the nitrogen component concentration, ammonium ion ($NH_4^+$), nitrite ion ($NO_2^-$), nitrate ion ($NO_3^-$), and other nitride components were quantitatively determined, and the respective nitrogen amounts in individual ions and their total amount were determined by atomic weight conversion. Table 2 shows thus obtained result.

TABLE 2

| Example 3 | Before processing | After nitrification | After de-nitrification |
|---|---|---|---|
| Total dioxin concentration* | 75 ng/L (1.3 ng-TEQ/L) | 13 ng/L (0.15 ng-TEQ/L) | 13 ng/L (0.15 ng-TEQ/L) |
| $NH_4^+$—N concentration | — | 0.1 mg/L | 2.1 mg/L |
| $NO_2^-$—N concentration | — | 0.1 mg/L | <0.1 mg/L |
| $NO_3^-$—N concentration | — | 1800 mg/L | <0.1 mg/L |
| Total nitrogen (T—N) concentration | — | 1800 mg/L | 3.2 mg/L |

*The value on the upper part of each two-part cell indicates the value before toxic equivalency conversion, whereas the parenthesized value thereunder indicates the value after toxic equivalency conversion.

From these results, it has been verified that the ratio of eliminating dioxins from the sample by nitrifying and denitrifying treatments is about 83% as the value before toxic equivalency conversion, and about 88% as the value after toxic equivalency conversion, whereby dioxins can be eliminated at sufficiently high efficiencies. The nitrogen component existing at a concentration of 1800 mg/L after the nitrifying treatment was mostly nitrogen contained in nitrate ion, which was oxidized nitrogen, and was lowered to 3.2 mg/L by the denitrifying treatment.

From these facts, it can be understood that the present invention can fully decompose and eliminate dioxins in the object to be processed and greatly lower the nitrogen component in the processed liquid.

Example 4

Biological sludge (5.5 L) subjected to waste water processing of leachate was accommodated in a stainless container acting as the denitrifying bath 33 shown in FIG. 5, the processing temperature was adjusted to 25° C., and 2400 mg of methanol and a slight amount of hydrochloric acid were added to this biological sludge. This stainless container was tightly closed, so as to block the communication of air with the outside, thereby attaining an anaerobic atmosphere therein, and the mixture was stirred for 2 hours in this state, so as to eliminate oxidized nitrogen.

After 0.5 L of an analysis sample was collected from this mixture, the remaining 5 L was continuously kept in the anaerobic atmosphere for 60 days. After the lapse of 3, 5, 10, 20, and 30 days during this period, respective analysis samples were collected. Upon sampling, each analysis sample was rapidly collected, then nitrogen gas was diffused therein for 10 minutes, and the sample was tightly sealed. This analysis sample was subjected to analysis immediately after being collected.

Figure 8:
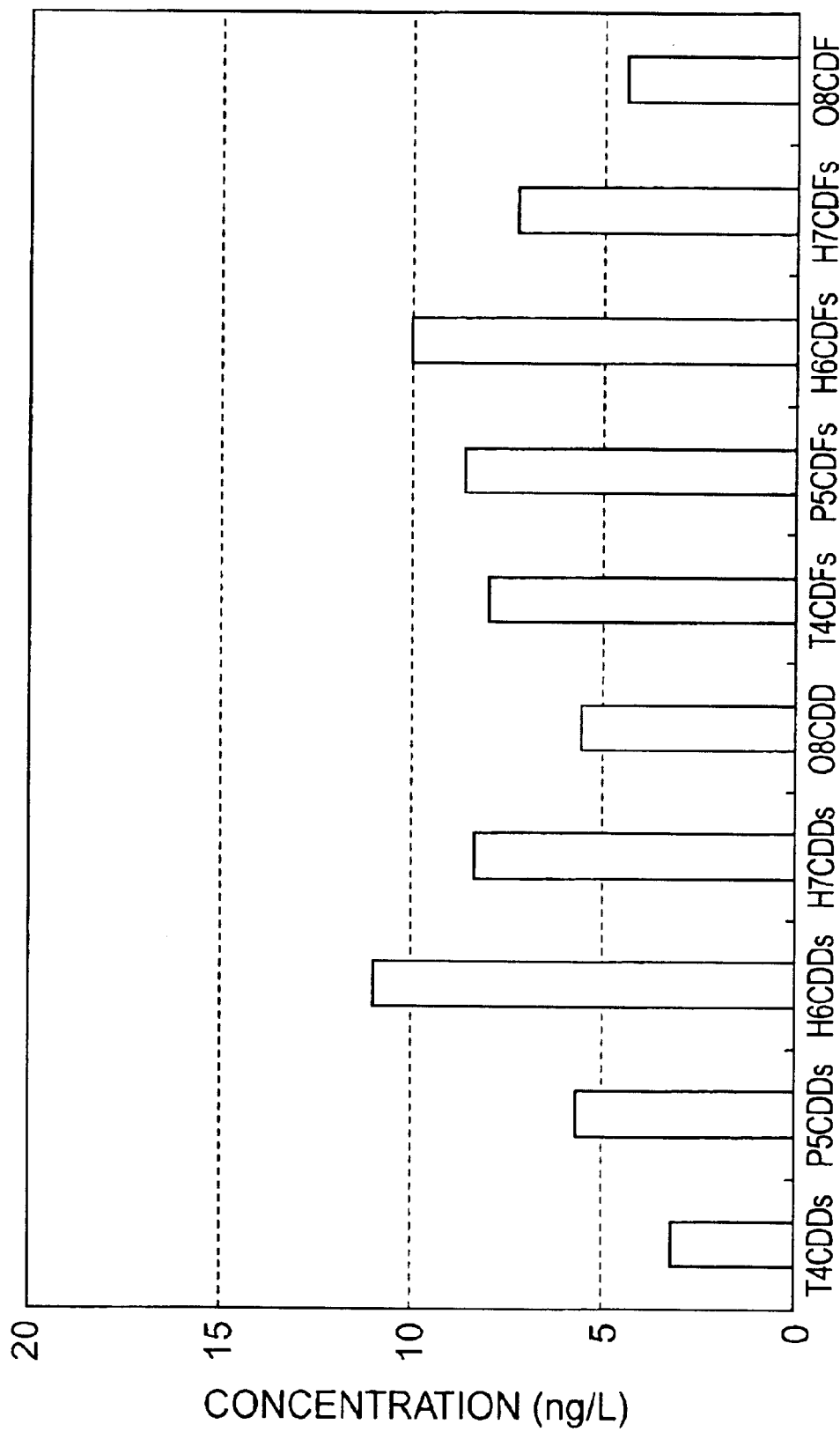
FIG. 8 is a graph showing a homologue concentration distribution of dioxins contained in a mixture after oxidized nitrogen is eliminated in Example 4.

Next, as in Example 3, the concentrations of dioxins and nitrogen components in the mixture were analyzed before the processing and after eliminating oxidized nitrogen in Example 4. These analyzed values are shown in Table 3 together with MLSS concentrations and pH values. Also, the homologue concentration distribution of dioxins contained in the mixture after eliminating oxidized nitrogen is shown in FIG. 8.

TABLE 3

| Example 4 | Before processing | After eliminating oxidized nitrogen |
|---|---|---|
| Total dioxin concentration* | 72 ng/L (1.1 ng-TEQ/L) | 71 ng/L (1.1 ng-TEQ/L) |
| $NH_4^+$—N concentration | 5 mg/L | 6 mg/L |
| $NO_2^-$—N concentration | 20 mg/L | <1 mg/L |
| $NO_3^-$—N concentration | 150 mg/L | <1 mg/L |
| Total nitrogen (T—N) concentration | 180 mg/L | 8 mg/L |
| MLSS concentration | 7300 mg/L | 7300 mg/L |
| pH | 7.8 | 7.9 |

*The value on the upper part of each two-part cell indicates the value before toxic equivalency conversion, whereas the parenthesized value thereunder indicates the value after toxic equivalency conversion.

From the results shown in Table 3, it has been verified that oxidized nitrogen components are sufficiently lowered when the mixture, with methanol added thereto, is stirred for about 2 hours in an anaerobic atmosphere under the conditions in Example 4.

Figure 9:
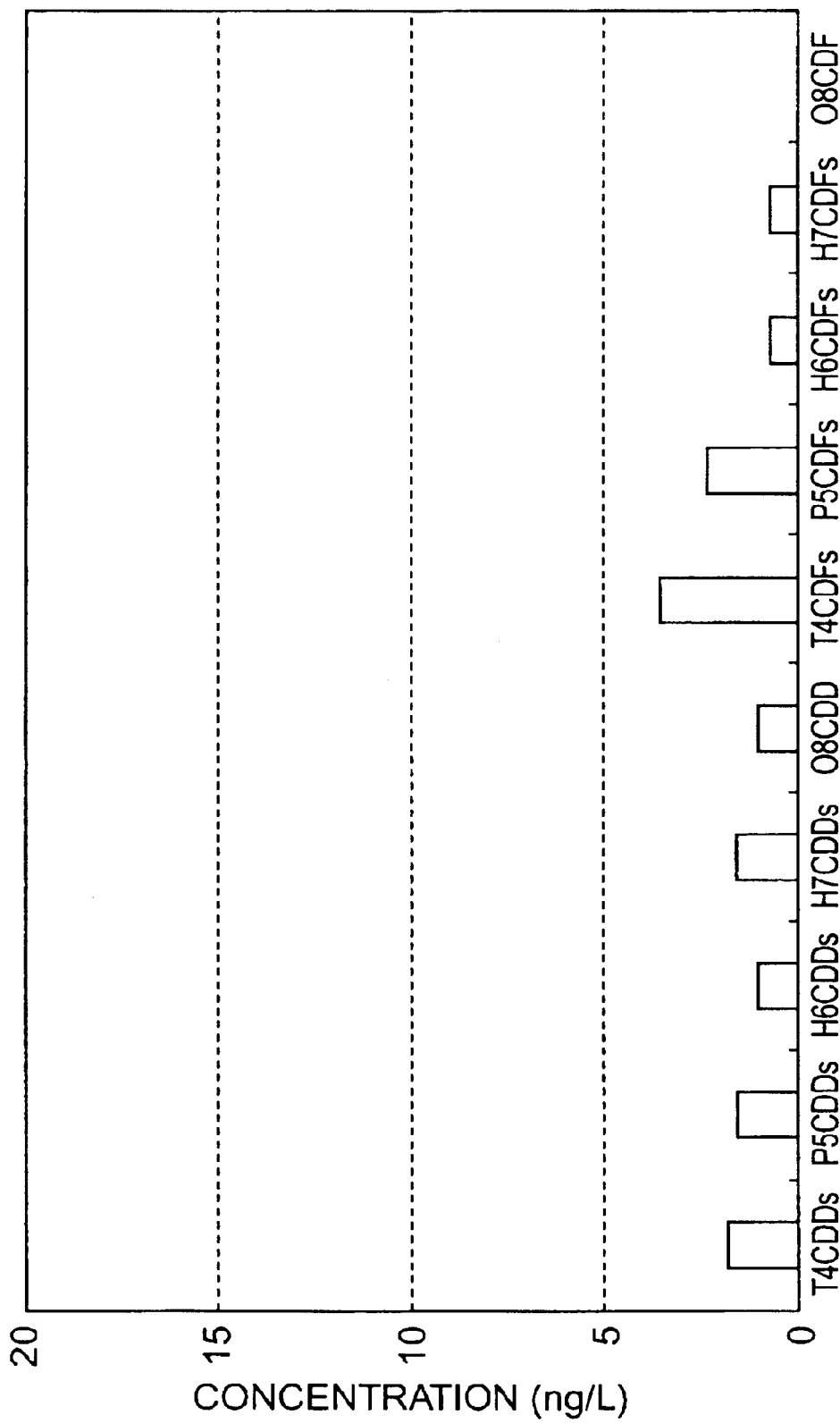
FIG. 9 is a graph showing a homologue concentration distribution of dioxins contained in an analysis sample collected after the anaerobic atmosphere in Example 4 has been maintained for 30 days.

Table 4 shows the dioxin concentration in each analysis sample, and the eliminating ratio therein with respect to the concentration of dioxins in the mixture after eliminating oxidized nitrogen. FIG. 9 shows the homologue concentration distribution of dioxins contained in the analysis sample collected after the anaerobic atmosphere had been maintained for 30 days.

TABLE 4

| Example 4 | Total dioxin concentration* | Eliminating efficiency |
|---|---|---|
| After 3 days | 59 ng/L (0.81 ng-TEQ/L) | 18% |
| After 5 days | 51 ng/L (0.69 ng-TEQ/L) | 29% |
| After 10 days | 34 ng/L (0.29 ng-TEQ/L) | 53% |
| After 20 days | 23 ng/L (0.19 ng-TEQ/L) | 68% |
| After 30 days | 14 ng/L (0.18 ng-TEQ/L) | 81% |
| After 60 days | 15 ng/L (0.19 ng-TEQ/L) | 79% |

*Each parenthesized value indicates the value after toxic equivalence conversion.

From the results shown in Table 4, it has been verified that at least about 70% of dioxins are decomposed and eliminated when the anaerobic property has been maintained for at least 20 days under the processing conditions in Example 4. Also, from the comparison of FIGS. 8 and 9, it has been elucidated that dioxins can be decomposed and eliminated throughout all of low-chlorinated to high-chlorinated dioxins. In the conventional biological processing methods mentioned previously, dioxins decomposable thereby tend to be limited to low-chlorinated dioxins. Therefore, from these results, the superiority of the present invention has been confirmed.

Comparative Example 2

The biological sludge (18 L) identical to that of Example 4 was accommodated in a stainless container, water temperature was adjusted to 25° C., and 7900 mg of methanol and a slight amount of hydrochloric acid were added to the biological sludge. The stainless container was tightly closed, so as to attain an anaerobic atmosphere therein, and the mixture was stirred for 2 hours in this state, so as to eliminate oxidized nitrogen. Thereafter, the pH of this mixture was adjusted to 7.5 with an acid or alkali, and aeration with air at 10 L/min was continued for 20 days.

Then, the concentration of dioxins in the mixture was analyzed as in Example 4. As a result, the total dioxin concentration after 20 days of processing was 57 ng/L (0.85 ng-TEQ/L), whereby the eliminating ratio was 21%. Thus, it has been confirmed that dioxins cannot fully be decomposed by a method simply carrying out aeration without keeping the object in an anaerobic atmosphere.

Example 5

From biological sludge having been subjected to another waste water treatment for leachate, oxidized nitrogen was eliminated as in Example 3, and then 5 L of the resulting mixture were collected into a stainless container. With the processing temperature being set to three types of 12° C., 15° C., and 18° C., an anaerobic state was continuously kept for 20 hours, and then the dioxin concentration in the mixture at each temperature setting was analyzed as in Example 3. Table 5 shows the water quality conditions after eliminating oxidized nitrogen.

TABLE 5

| Example 5 | After eliminating oxidized nitrogen |
|---|---|
| Total dioxin concentration* | 71 ng/L (1.1 ng-TEQ/L) |
| $NH_4^+$—N concentration | 7 mg/L |
| $NO_2^-$—N concentration | <1 mg/L |
| $NO_3^-$—N concentration | <1 mg/L |
| Total nitrogen (T—N) concentration | 11 mg/L |
| MLSS concentration | 6900 mg/L |
| pH | 7.5 |

*The parenthesized value indicates the value after toxic equivalence conversion.

Table 6 shows the total dioxin concentration in the mixture when the latter was continuously kept in an anaerobic atmosphere for 20 days in each of three types of temperature settings, and the eliminating ratio with respect to the dioxin concentration in the mixture after eliminating oxidized nitrogen. From this table, it can be seen that the processing temperature at 15° C. or higher is effective in the anaerobic treatment process.

TABLE 6

| Example 5 | Total dioxin concentration* | Eliminating efficiency |
|---|---|---|
| 12° C. | 72 ng/L (1.0 ng-TEQ/L) | 8% |
| 15° C. | 35 ng/L (0.57 ng-TEQ/L) | 55% |
| 18° C. | 27 ng/L (0.44 ng-TEQ/L) | 65% |

*Each parenthesized value indicates the value after toxic equivalence conversion.

Example 6

Into a stainless container, 4 L of biological sludge having been subjected to waste water processing of leachate were accommodated, the processing temperature was adjusted to 25° C., and 2200 mg of methanol were added to the biological sludge. Further, 1 L or ferric chloride coagulated sludge collected from the leachate treatment process was added thereto. After the pH of the resulting mixture was adjusted to neutral, the stainless container was tightly closed, and an anaerobic state was kept therein for 20 days. Table 7 shows the respective water qualities of biological sludge and coagulated sludge.

TABLE 7

| Example 6 | Biological sludge | Coagulated sludge |
|---|---|---|
| Total dioxin concentration* | 62 ng/L (0.87 ng-TEQ/L) | 50 ng/L (0.67 ng-TEQ/L) |
| $NH_4^+$—N concentration | 5 mg/L | — |
| $NO_2^-$—N concentration | 40 mg/L | — |
| $NO_3^-$—N concentration | 130 mg/L | — |
| Total nitrogen (T—N) concentration | 180 mg/L | — |
| MLSS concentration | 7500 mg/L | 3900 mg/L (SS concentration |
| pH | 7.9 | — |

*The value on the upper part of each two-part cell indicates the value before toxic equivalency conversion, whereas the parenthesized value thereunder indicates the value after toxic equivalency conversion.

The total dioxin concentrations of the mixture of biological sludge and coagulated sludge before and after processing were 60 ng/L (0.83 ng-TEQ/L) and 21 ng/L (0.19 ng-TEQ/L), respectively, whereby the eliminating ratio after S processing was 65%, which was high. A dioxin eliminating ratio equivalent thereto was also obtained when the biological sludge and coagulated sludge were mixed together and then, with methanol being added thereto, oxidized nitrogen was eliminated in an anaerobic atmosphere, which was maintained for 20 days thereafter.

Example 7

Leachate was processed by use of the processing apparatus 7 shown in FIG. 7. First, leachate (BOD: 20 mg/L) as waste water J was supplied to the biological treatment bath 34 at 600 L/day, so as to carry out a biological treatment. It was then transferred to the sludge separating bath 35, and the processed water F1 was let out at 600 L/day. On the other hand, biological sludge Fa (20000 mg-MLSS/L) was drawn out from the sludge separating bath 35 at 150 L/day, in which 148 L/day were returned to the biological treatment bath 34, whereas the remaining 2 L/day were transferred to the nitrifying bath 32 (having a volume of 30 L).

An aerobic treatment was carried out with a retention time of 10 days in the nitrifying bath 32, and the resulting product was transferred to the denitrifying bath 33, where an anaerobic treatment was carried out. Subsequently, the sludge was returned from the denitrifying bath 33 to the nitrifying bath 32 at 1.8 L/day, and the remaining 0.2 L/day was introduced into a dehydrater acting as the sludge separating bath 36. In the dehydrater, sludge as the processed solid Fs and processed water F2 were separated from each other. The sludge was let out as surplus sludge at 20g/day (dry weight: 4.0g-dry/day), whereas the processed water F2 as dehydrated filtrate was returned to the biological treatment bath 34 at 0.18 L/day.

Such processing was carried out for 180 days. The BOD in the processed water F1 was always below 4 mg/L, whereby the processing was quite favorable. Also, the total dioxin concentration was analyzed in each of sludge and water samples after the lapse of 90 days and 180 days as in Example 3. Table 8 shows the results thereof. From Table 8, it has been verified that dioxin concentrations can fully be lowered in both of the surplus sludge and processed water let out of the system in accordance with the present invention.

Comparative Example 3

Leachate was processed as in Example 7 except that a part of sludge (0.2 L/day) drawn out from the sludge separating bath 35 was directly introduced into a dehydrater acting as the sludge separating bath 36 without using the nitrifying bath 32 and denitrifying bath 33. Also, as in Example 3, the total dioxin concentration was analyzed in each of sludge and water samples after the lapse of 90 days and 180 days. Table 8 shows these results as well. From Table 8, it has been verified that dioxins hardly decrease in both of surplus sludge and processed water if no treatment is carried out in the nitrifying bath 32 and denitrifying bath 33.

TABLE 8

|  |  | Total dioxin concentration after 90 days*[1] | Total dioxin concentration after 180 days*[1] |
| --- | --- | --- | --- |
| Example 7 | Returned sludge*[2] | 26 pg/g (0.32 pg-TEQ/g) | 15 pg/g (0.17 pg-TEQ/g) |
|  | Surplus sludge*[3] | 1.8 pg/g (0.011 pg-TEQ/g) | 0.6 pg/g (0.0053 pg-TEQ/g) |
|  | Waste water J | 36 pg/L (0.23 pg-TEQ/g) | 50 pg/L (0.42 pg-TEQ/g) |
|  | Processed water F1 | 4.2 pg/L (0.060 pg-TEQ/g) | 1.2 pg/L (0.0090 pg-TEQ/g) |
| Comparative example 3 | Returned sludge*[2] | 150 pg/g (1.9 pg-TEQ/g) | 240 pg/g (2.3 pg-TEQ/g) |
|  | Surplus sludge*[3] | 140 pg/g (1.9 pg-TEQ/g) | 240 pg/g (2.2 pg-TEQ/g) |
|  | Waste water J | 38 pg/L (0.23 pg-TEQ/g) | 50 pg/L (0.42 pg-TEQ/g) |
|  | Processed water F1 | 6.4 pg/L (0.10 pg-TEQ/g) | 8.4 pg/L (0.093 pg-TEQ/g) |

*[1]The value on the upper part of each cell indicates the value before toxic equivalency conversion, whereas the parenthesized value thereunder indicates the value after toxic equivalency conversion.
*[2]Indicates the sludge returned from the denitrifying bath 33 to the nitrifying bath 32.
*[3]Indicates the surplus sludge let out from the dehydrater acting as the sludge separating bath 36.

As explained in the foregoing, the method and apparatus for processing an organic chlorine compound in accordance with the present invention can easily and fully decompose hard-to-decompose organic chlorine compounds such as dioxins, and can cut down the processing cost.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of processing an organic chlorine compound for decomposing and eliminating the organic chlorine compound in an object to be processed which contains biological sludge, said method comprising a biological treatment process of causing a first microorganic body capable of oxidizing reduced nitrogen to come into contact with said object to be processed, and biologically processing said object to be processed in a state containing said first microorganic body, so as to decompose said organic chlorine compound, wherein said biological treatment process comprises:
        an anaerobic treatment process in which said object to be processed containing said first microorganic body keeping a biological activity thereof by way of a biological treatment in an aerobic atmosphere is held in an anaerobic atmosphere,
        wherein, in said aerobic treatment process, supply of a gas containing oxygen to said object to be processed is blocked, so as to form an anaerobic atmosphere, and said anaerobic atmosphere is maintained.

2. A method of processing an organic chlorine compound for decomposing and eliminating the organic chlorine compound in an object to be processed, said method comprising a biological treatment process of causing a first microorganic body capable of oxidizing reduced nitrogen to come into contact with said object to be processed, and biologically processing said object to be processed in a state containing said first microorganic body, so as to decompose said organic chlorine compound;

a reduced nitrogen adding process for adding reduced nitrogen to said object to be processed; and further comprising a slurry-forming process of causing at least one of said object to be processed, said first microorganic body, and a second microorganic body to become slurry.

3. A method of processing an organic chlorine compound for decomposing and eliminating the organic chlorine compound in an object to be processed,
   said method comprising a biological treatment process of causing a first microorganic body capable of oxidizing reduced nitrogen to come into contact with said object to be processed, and biologically processing said object to be processed in a state containing said first microorganic body, so as to decompose said organic chlorine compound;
   a reduced nitrogen adding process for adding reduced nitrogen to said object to be processed;
   wherein as said first microorganic body and/or a second microorganic body, those in a dehydrated cake form whose moisture is at least partly eliminated or in a lyophilized powder form are used.

4. A method of processing an organic chlorine compound for decomposing and eliminating the organic chlorine compound in an object to be processed,
   said method comprising a biological treatment process of causing a first microorganic body capable of oxidizing reduced nitrogen to come into contact with said object to be processed, and biologically processing said object to be processed in a state containing said first microorganic body, so as to decompose said organic chlorine compound;
   a reduced nitrogen adding process for adding reduced nitrogen to said object to be processed;
   wherein, in said reduced nitrogen adding process and/or reduced nitrogen adding step, reduced nitrogen is added to said object to be processed such that the content of said reduced nitrogen with respect to 1 ng of said organic chlorine compound becomes 0.01 to 10 g-N.

5. A method of processing an organic chlorine compound for decomposing and eliminating the organic chlorine compound in an object to be processed,
   said method comprising a biological treatment process of causing a first microorganic body capable of oxidizing reduced nitrogen to come into contact with said object to be processed, and biologically processing said object to be processed in a state containing said first microorganic body, so as to decompose said organic chlorine compound;
   a reduced nitrogen adding process for adding reduced nitrogen to said object to be processed; and
   an anaerobic treatment process of oxidizing reduced nitrogen contained in said object to be processed with said first microorganic body and decomposing said organic chlorine compound in an aerobic atmosphere.

6. A method of processing an organic chlorine compound according to claim 5, wherein said aerobic treatment process has:
   a first microorganic body adding step of adding said first microorganic body to said object to be processed;
   a reduced nitrogen adding step of adding reduced nitrogen to said object to be processed; and
   a decomposing step of supplying a gas containing oxygen to said object to be processed, so as to form an aerobic atmosphere, and causing said first microorganic body to oxidize reduced nitrogen and decompose said organic chlorine compound.

7. A method of processing an organic chlorine compound according to claim 5, further comprising:
   a mixing process of an object to be processed, in which said object to be processed in at least one of said aerobic treatment process, said oxidized nitrogen eliminating process, and an anaerobic treatment process is added by another object to be processed, different therefrom, containing an organic chlorine compound.

8. A method of processing an organic chlorine compound according to claim 5, wherein said aerobic treatment process has:
   a pH adjusting step of adjusting the pH of said object to be processed containing said first microorganic body and reduced nitrogen to a range of 5 to 9; or
   a desalting step of adjusting said salt concentration of said object to be processed to 4% or lower; or both said pH adjusting step and said desalting step.

9. A method of processing an organic chlorine compound for decomposing and eliminating the organic chlorine compound in an object to be processed,
   said method comprising:
   a biological treatment process for causing a first microorganic body capable of oxidizing reduced nitrogen to come into contact with said object to be processed, and biologically processing said object to be processed in a state containing said first microorganic body, so as to decompose said organic chlorine compound; and
   an oxidized nitrogen eliminating process of reducing and eliminating oxidized nitrogen contained in said object to be processed with a second microorganic body capable of reducing oxidized nitrogen in an anaerobic atmosphere.

10. A method of processing an organic chlorine compound according to claim 9, wherein said oxidized nitrogen eliminating process has:
    a second microorganic body adding step of adding said second microorganic body to said object to be processed;
    a carbon source adding step of adding to said object to be processed an organic carbon source which becomes a nutrient for said second microorganic body; and
    an eliminating step of blocking supply of a gas containing oxygen to said object to be processed, so as to form an anaerobic atmosphere, and causing said second microorganic body to reduce and eliminate said oxidized nitrogen.

11. A method of processing an organic chlorine compound for decomposing and eliminating the organic chlorine compound in an object to be processed,
    said method comprising a biological treatment process of causing a first microorganic body capable of oxidizing reduced nitrogen to come into contact with said object to be processed, and biologically processing said object to be processed in a state containing said first microorganic body, so as to decompose said organic chlorine compound,
    wherein said biological treatment process comprises:
    an anaerobic treatment process in which said object to be processed containing said first microorganic body keeping a biological activity thereof by way of a biological treatment in an aerobic atmosphere is held in an anaerobic atmosphere.

12. A method of processing an organic chlorine compound according to claim 11,
    wherein, in said aerobic treatment process, supply of a gas containing oxygen to said object to be processed is blocked, so as to form an anaerobic atmosphere, and said anaerobic atmosphere is maintained.

13. A method of processing an organic chlorine compound according to claim 11, wherein the temperature of said object to be processed is held at 15° C. or higher in said anaerobic treatment process.

* * * * *